United States Patent
Guo et al.

(10) Patent No.: US 10,977,632 B2
(45) Date of Patent: Apr. 13, 2021

(54) ELECTRONIC BILL MANAGEMENT METHOD, APPARATUS, AND STORAGE MEDIUM

(71) Applicant: TENCENT TECHNOLOGY (SHENZHEN) COMPANY LIMITED, Guangdong (CN)

(72) Inventors: Rui Guo, Shenzhen (CN); Mao Cai Li, Shenzhen (CN); Jian Jun Zhang, Shenzhen (CN); Hai Tao Tu, Shenzhen (CN); Qi Zhao, Shenzhen (CN); Zong You Wang, Shenzhen (CN); Jun Liang, Shenzhen (CN); Da Wei Zhu, Shenzhen (CN); Bin Hua Liu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 57 days.

(21) Appl. No.: 16/384,349

(22) Filed: Apr. 15, 2019

(65) Prior Publication Data
US 2019/0244186 A1     Aug. 8, 2019

Related U.S. Application Data

(63) Continuation of application No. PCT/CN2018/078171, filed on Mar. 6, 2018.

(30) Foreign Application Priority Data

Mar. 10, 2017    (CN) .................. 201710142464.X

(51) Int. Cl.
    *G06Q 20/14*      (2012.01)
    *G06Q 20/40*      (2012.01)
    (Continued)

(52) U.S. Cl.
    CPC .......... *G06Q 20/14* (2013.01); *G06Q 20/102* (2013.01); *G06Q 20/3825* (2013.01);
    (Continued)

(58) Field of Classification Search
    CPC .. G06Q 20/14; G06Q 20/102; G06Q 20/3825; G06Q 20/401; G06Q 20/4016
    See application file for complete search history.

(56) References Cited

U.S. PATENT DOCUMENTS 6,304,857 B1 * 10/2001 Heindel ................ G06Q 30/04
                                                                          705/34
2015/0294380 A1 * 10/2015 Kikuchi ................ G06Q 30/04
                                                                          705/34

(Continued)

FOREIGN PATENT DOCUMENTS

CN        105976232 A       9/2016
CN        106127578 A * 11/2016

(Continued)

OTHER PUBLICATIONS

Communication dated Jun. 30, 2020 by the Japanese Patent Office in application No. 2019-526479.

(Continued)

*Primary Examiner* — Robert R Niquette
*Assistant Examiner* — Pierre L Maccagno
(74) *Attorney, Agent, or Firm* — Sughrue Mion, PLLC

(57) ABSTRACT

An electronic bill management method performed in an electronic bill management system is provided. A bill issuance request of a first user including original bill information is received. A first bill account corresponding to the first user is generated based on the original bill information, and account information of the first bill account is stored to an account table in the electronic bill management system. A second block is generated based on the bill issuance request, (Continued)

the first bill account, and a block header eigenvalue of a first block in a block chain in the electronic bill management system. The first block is a previous block of the second block in the block chain, and a bill issuance event of the first user is recorded based on the second block. An issuance success message is transmitted to the first user, the issuance success message including the first bill account.

20 Claims, 18 Drawing Sheets

(51) Int. Cl.
  *G06Q 20/10* (2012.01)
  *G06Q 20/38* (2012.01)
(52) U.S. Cl.
  CPC ....... *G06Q 20/401* (2013.01); *G06Q 20/4016* (2013.01); *G06Q 2220/00* (2013.01)

(56) References Cited

U.S. PATENT DOCUMENTS

| | | | | |
|---|---|---|---|---|
| 2016/0330034 | A1* | 11/2016 | Back | H04L 9/3255 |
| 2017/0046652 | A1* | 2/2017 | Haldenby | G06Q 20/065 |
| 2019/0229927 | A1* | 7/2019 | Guo | G06F 21/6245 |
| 2019/0244186 | A1* | 8/2019 | Guo | G06Q 20/102 |
| 2019/0259024 | A1* | 8/2019 | Zhang | G06Q 20/0655 |

FOREIGN PATENT DOCUMENTS

| | | | | |
|---|---|---|---|---|
| CN | 106127578 | A | | 11/2016 |
| CN | 106452785 | A | | 2/2017 |
| CN | 106952094 | A * | 7/2017 | ........... G06Q 20/401 |
| CN | 106952094 | A | | 7/2017 |
| JP | 2003-256651 | A | | 9/2003 |
| KR | 10-2002-0003852 | A | | 1/2002 |
| KR | 10-0512151 | B1 | | 9/2005 |

OTHER PUBLICATIONS

English Translation of the Written Opinion dated May 30, 2018 by the International Searching Authority in application No. PCT/CN2018/078171.
Laborsaving, "Fintec" Demonstration Experiment Mitsubishi UFJ, Tokyo Yomiuri Shimbun, Aug. 29, 2016, Asahi, p. 2 (2 pages total).
International Search Report of PCT/CN2018/078171 dated May 30, 2018 [PCT/ISA/210].
Written Opinion of PCT/CN2018/078171 dated May 30, 2018 [PCT/ISA/237].
Office Action of Chinese Application No. 201710142464.X dated May 18, 2018.
Communication dated Dec. 24, 2020, issued by the Korean Intellectual Property Office in Korean Application No. 10-2019-7022822.

* cited by examiner

| | |
|---|---|
| Bill number | 2313290020002 |
| Bill amount | 10000 |
| Date of issue | 20160901 |
| Draft due date | 20161230 |
| Drawer number | 200000001 |
| Drawer fullname | Asset gateway |
| Drawer bank account | 6255928200006688888 |
| Drawer deposit bank | Industrial and Commercial Bank |
| Payee fullname | Supplier B |
| Payee bank account | 62159999997777788880 |
| Payee deposit bank | Construction Bank |
| Asset issuance amount | 100000 |

FIG. 3

Your information is being audited. Please wait…

| Enterprise fullname | Supplier B |
|---|---|
| Organization code | 05266634-7 |
| Bank account | 621111111888823333 |
| Deposit bank | Construction Bank |
| Enterprise contact | Wang Wu |
| Contact phone | 18888833377 |
| Contact address | Road B, District A, Tianjin |

FIG. 4

ELECTRONIC BILL MANAGEMENT METHOD, APPARATUS, AND STORAGE MEDIUM

CROSS REFERENCE TO RELATED APPLICATION(S)

This application is a continuation of International Application No. PCT/CN2018/078171, filed on Mar. 6, 2018, in the Chinese Patent Office, which claims priority to Chinese Patent Application No. 201710142464.X, entitled "ELECTRONIC BILL MANAGEMENT METHOD AND APPARATUS" filed with China National Intellectual Property Administration on Mar. 10, 2017, the disclosures of which are incorporated in their entireties by reference.

BACKGROUND

1. Field

Exemplary embodiments relate to the field of network technologies, and in particular, to an electronic bill management method, an apparatus, and a storage medium.

2. Description of the Related Art

Based on the development of network technologies, network products such as an electronic bill and an electronic certificate are introduced. The electronic bill refers to a bill stored in a data message form. The electronic bill is mainly applied to a commercial trade process, and may be transferred, discounted or pledged in the commercial trade process. For example, if an enterprise user A purchases a batch of goods from an enterprise user B, although the enterprise user A has not paid corresponding funds to the enterprise user B, the enterprise user B may still obtain an electronic bill through an E-bank. The electronic bill records transaction information between the enterprise user A and the enterprise user B, including debt information, bill holder information, a date of issue, a due date, and the like. As the bill holder of the electronic bill, the enterprise user B may transfer, discount, or pledge the electronic bill through the E-bank.

Because networks have security hazards of being invaded by malicious users, the transaction information of the electronic bill may be maliciously tampered, causing poor security and reliability of the electronic bill.

SUMMARY

To solve the problem of poor security and reliability of an electronic bill in the related art technology, one or more exemplary embodiments provide an electronic bill management method and apparatus, and a storage medium.

According to an aspect of an exemplary embodiment, provided is an electronic bill management method performed in an electronic bill management system is provided. A bill issuance request of a first user is received, the bill issuance request including original bill information. A first bill account corresponding to the first user is generated based on the original bill information, and account information of the first bill account is stored to an account table in the electronic bill management system. A second block is generated based on the bill issuance request, the first bill account, and a block header eigenvalue of a first block in a block chain in the electronic bill management system. The first block is a previous block of the second block in the block chain, and a bill issuance event of the first user is recorded based on the second block. An issuance success message is transmitted to the first user, the issuance success message including the first bill account.

According to an aspect of another exemplary embodiment, provided is an electronic bill management apparatus, the apparatus including: at least one memory operable to store program code; and at least one processor operable to read the program code and operate as instructed by the program code, the program code including: receiving code configured to cause the at least one processor to receive a bill issuance request of a first user, the bill issuance request including original bill information; account generation code configured to cause the at least one processor to generate, based on the original bill information, a first bill account corresponding to the first user, and store account information of the first bill account to an account table in an electronic bill management system; block generation code configured to cause the at least one processor to generate a second block based on the bill issuance request, the first bill account, and a block header eigenvalue of a first block in a block chain in the electronic bill management system, the first block being a previous block of the second block in the block chain, a bill issuance event of the first user being recorded based on the second block; and transmitting code configured to cause the at least one processor to transmit an issuance success message to the first user, the issuance success message including the first bill account.

According to an aspect of another exemplary embodiment, provided is a non-transitory computer storage medium storing instructions, which, when executed by at least one processor, cause the at least one processor to perform: receiving a bill issuance request of a first user, the bill issuance request comprising original bill information; generating, based on the original bill information, a first bill account corresponding to the first user, and storing account information of the first bill account to an account table in an electronic bill management system; generating a second block based on the bill issuance request, the first bill account, and a block header eigenvalue of a first block in a block chain in the electronic bill management system, the first block being a previous block of the second block in the block chain, a bill issuance event of the first user being recorded based on the second block; and transmitting an issuance success message to the first user, the issuance success message including the first bill account.

According to the embodiments, based on original bill information of a first user, not only a first bill account corresponding to the first user is generated in an account table, but also a second block is generated based on a bill issuance request of the first user, the first bill account, and a block header eigenvalue of a first block in a block chain. Therefore, not only account information can be managed by using the account table, but also any information in the block, when being tampered, can be detected by using a next block and based on an association relationship between front and back blocks in the block chain, to prevent a malicious user from tampering or denying an issued electronic bill, thereby ensuring the security and reliability of the transaction information.

BRIEF DESCRIPTION OF THE DRAWINGS

These and/or other aspects will become apparent and more readily appreciated from the following description of the embodiments, taken in conjunction with the accompanying drawing.

FIG. 3 illustrates an interface for receiving original data information according to an embodiment.

FIG. 4 illustrates an interface for registration according to an embodiment.

DETAILED DESCRIPTION

To make the objectives, technical solutions, and advantages of the embodiments of the disclosure clearer, the following further describes implementations of the present disclosure in detail with reference to the accompanying drawings.

In subsequent descriptions, suffixes such as "module", "component", or "unit" that are used to represent elements are merely conducive to the descriptions of the embodiments, and have no specific meanings themselves. It will be understood that, the terms, such as "unit," "module," "component," "part," etc., should be understood as a unit that performs at least one function or operation and that may be embodied as hardware, software, or a combination thereof.

A plurality of details is described in the following detailed descriptions for thorough understanding of the disclosure. However, for persons of ordinary skill in the art, the disclosure may obviously be implemented without these details. In other cases, a disclosed well-known method, process, assembly, circuit, and network are not described in detail, to not to unnecessarily obscure the aspects of the embodiments.

In addition, in this specification, although elements (or thresholds or applications or instructions or operations) are described by using terms such as "first" and "second" for a plurality of times, the elements should not be limited by these terms. These terms are merely used to distinguish between an element and another element. For example, a first operation may be referred to as a second operation, and the second operation may also be referred to as the first operation.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
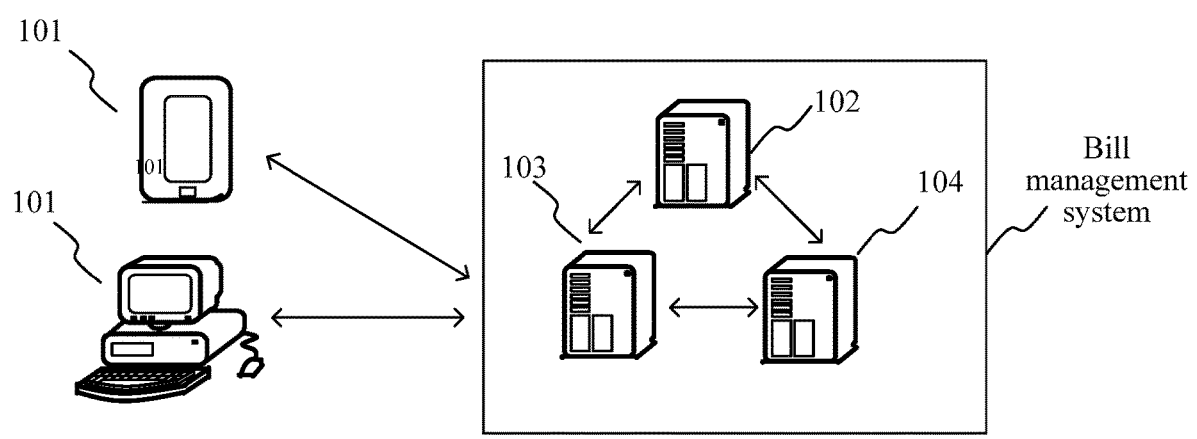
FIG. 1 is a schematic diagram of an implementation environment of an electronic bill management method according to an embodiment.

FIG. 1 is a schematic diagram of an implementation environment of an electronic bill management method according to an embodiment. As shown in FIG. 1, the implementation environment may be an electronic bill management system, and the electronic bill management system and a user terminal 101 may separately store a same block chain. The block chain is formed by a plurality of blocks, each block stores different pieces of information, and each piece of information is stored on each block based on a time sequence.

In an exemplary embodiment, each block may store information involving one transaction. The electronic bill management system is configured to manage an electronic bill of the user of the user terminal 101, for example, issue or transact the electronic bill, and store transaction information to the blocks in the block chain in the issuance and transaction process. The user terminal 101 is configured to interact with the electronic bill management system, to issue the electronic bill or transact with other users, and the user terminal 101 may be a terminal of a user, specifically a supplier user, a personal user, an enterprise user, a bank user, or the like. In the transaction process, the user terminal 101 may be an electronic device used by the user such as, for example but not limited to, a notebook computer, a desktop computer, a smartphone, or the like.

The electronic bill management system according to an exemplar embodiment may include at least two nodes, where at least two nodes may include at least two servers 102, and may further include a gateway 103, and the like. The electronic bill management system may be a Digit Asset Management (DAM) system. The at least two servers 102 are configured to manage electronic bills of users based on a block chain technology. The gateway 103 is configured to provide an access service between the user terminal 101 and the DAM, and may also be used as an accounting node in the implementation environment, to store transaction information in the transaction process, and update the transaction information regularly. Accordingly, other nodes in the implementation environment may share the transaction information, so that the nodes may provide a certificate of conformity for the transaction information, thereby improving the security of the transaction information. For example, when a bill transfer process is completed, the accounting node may share the transaction information to block chains of the nodes according to node identifiers (such as network addresses) of the nodes. The server 102 may interact with the user terminal 101 by using the gateway 103, to manage the electronic bill of the user terminal 101. In an actual running process, the electronic bill management system further involves an interaction with a banking system 104. The banking system 104 is configured to provide real commercial bill information, to verify the authenticity of original bill information submitted by the user.

In addition to one block chain, the electronic bill management system may further store an account table. The account table stores at least one bill account used to identify an electronic bill and corresponding account information for describing the electronic bill, such as an account state and account balances. The account table may be correspondingly updated according to transactions, thereby implementing a method for dynamically updating an electronic bill in a transaction process.

To ensure the security of the account information, the account information in the account table may also be stored to the block chain with each transaction process, that is, the account table is stored to the block chain. Because information in the block chain is unchangeable, each time the account information needs to be updated in the transaction process, original account information does not need to be modified. Instead, the updated account information is stored to a new block.

It should be noted that, the electronic bill system according to an exemplary embodiment may be based on an Application Programming Interface (API) of the HyperText Transfer Protocol (HTTP). The API interface uses mutual certificate authentication, supports POST invoking of JavaScript Object Notation (JSON) data, and uniformly returns the JSON data. To avoid the abnormity caused by multi-character set encoding, character encoding of the electronic bill system may uniformly use 8-bit Unicode Transformation Format (UTF-8) encoding. The JavaScript is an interpreted scripting language. The POST invoking is an important constituent part in the HTTP Protocol, and is used to send an update request to a destination server. The electronic bill management system may further use a signature algorithm such as an Elliptic Curve Digital Signature Algorithm (ECDSA), to sign a message initiated by a user during a transaction. The signature algorithm may be divided into two parts of parameters. The first part is a business parameter, and the business parameter needs to initiate a user to sign by using a private key of the user, and a DAM platform to perform verification by using a public key of the user. The second part is a protocol parameter, and the protocol parameter needs to initiate an https requester (a gateway/a participant with a researching and developing capability) to sign by using a private key of the requester, and a DAM platform to perform verification by using a public key of the requester.

Figure 2:
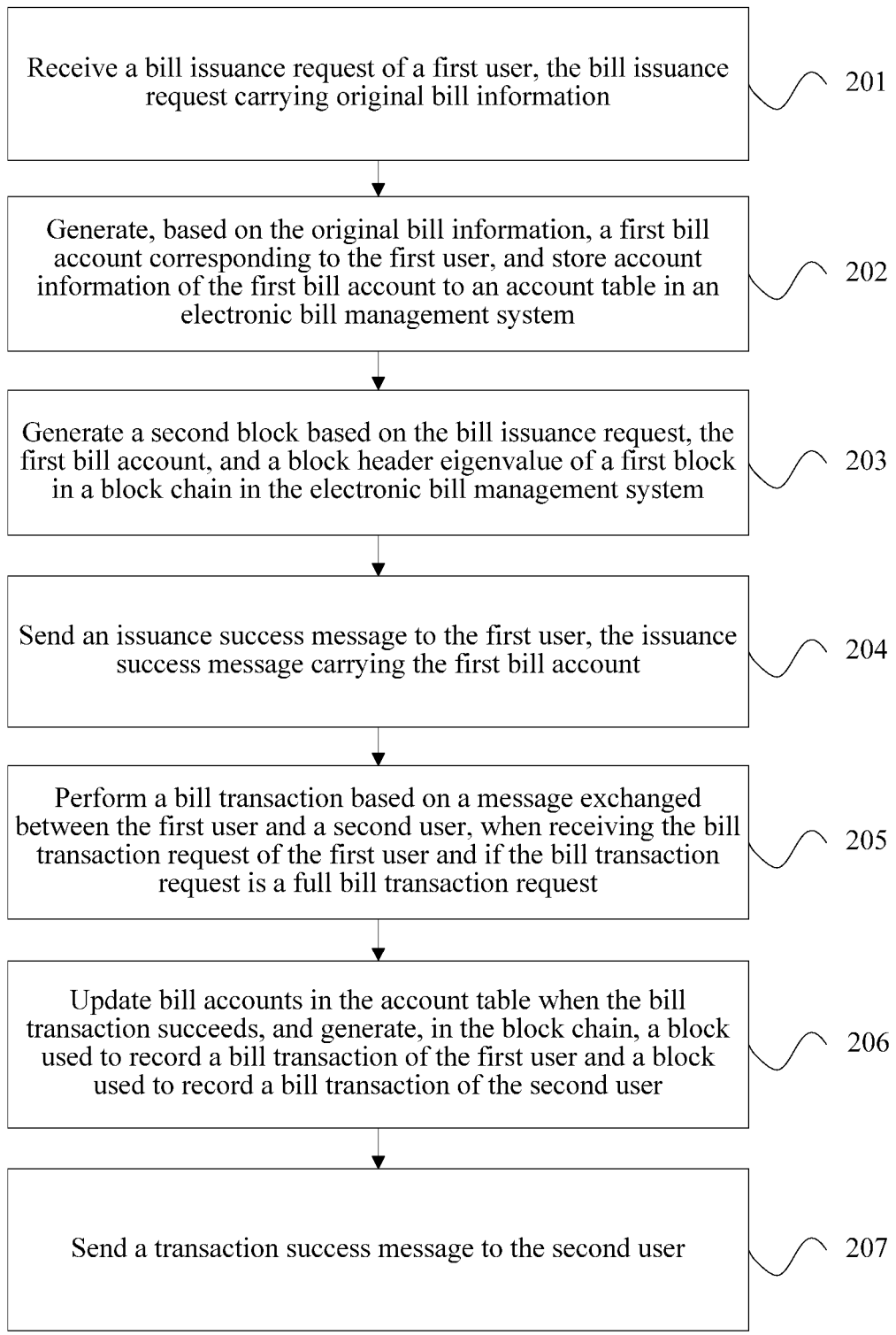
FIG. 2 is a schematic diagram of an electronic bill management method according to an embodiment.

FIG. 2 is a schematic diagram of an electronic bill management method according to an embodiment. Referring to FIG. 2, the method is applied to an electronic bill management system, and specifically includes operations 201-207:

201. Receive a bill issuance request of a first user, the bill issuance request carrying original bill information.

The first user refers to any user registering in the electronic bill management system, and is not limited to a personal user, an enterprise user, a bank user, or the like. The original bill information refers to bill information of a commercial bill held by a user, includes at least a bill identifier of the original bill information, and may further include asset information, a date of issue, and a due date of the commercial bill, a bank account, a deposit bank, and issue asset information of the user, and the like.

FIG. 3 is an interface for receiving original data information (or an original data information filling interface) according to an embodiment. Referring to FIG. 3, an exemplary embodiment provides an original data information filling interface, and the original data information filling interface provides input boxes for filling the foregoing plurality of pieces of bill information, so as to obtain the information input by the user from the input boxes after the user confirms and submits the information, and further send the information to the electronic bill management system.

In an exemplary embodiment, to ensure the security of the electronic bill transaction, a transaction real-name system may be used. Any user may provide identity information of the user when registering in the electronic bill management system. For example, a personal user may provide an identity number of the user, and an enterprise user may provide an enterprise code of the user. A user may fill registration information on a registration interface provided by the electronic bill management system, and submits a registration request to the electronic bill management system.

FIG. 4 is an interface for registration according to an embodiment. Referring to FIG. 4, an embodiment provides a registration interface for registering a user. The registration interface displays an enterprise full name input box, an organization code input box, a bank account input box, a deposit bank input box, an enterprise contact input box, an enterprise phone input box, and a contact address input box. Based on information input in the input boxes by a user, user identity information such as "the enterprise fullname is a supplier B, the organization code is 0526634-7, the enterprise contact is Wang Wu, the contact phone number is 18888833377, and the contact address is Road B, District A, Tianjin", and bank account information such as "the bank account is 6211111111888823333, and the deposit bank is the Construction Bank" may be obtained.

Figure 5:
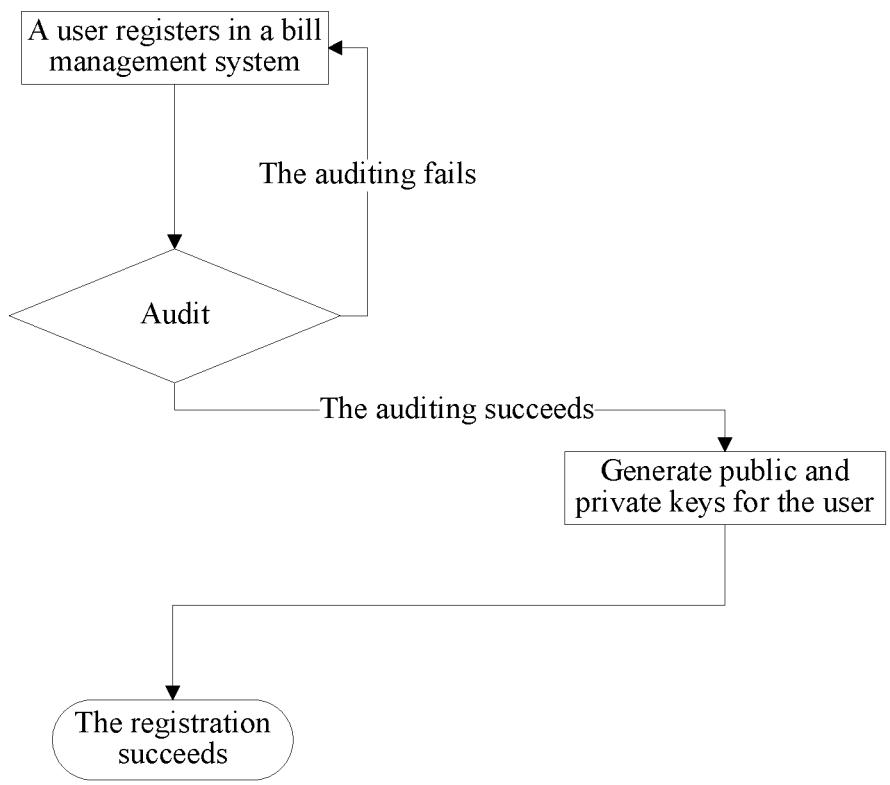
FIG. 5 is a flowchart illustrating a user registration process according to an embodiment.

FIG. 5 is a flowchart illustrating a user registration process according to an embodiment. Referring to FIG. 5, when receiving a registration request of a user, an electronic bill management system may verify, in a public security organization, whether identity information carried in the registration request is real (authentic). If the identity information is unreal (unauthentic), the electronic bill management system rejects the user registration, and if the identity information is real, the electronic bill management system allows the user to register, generates a pair of keys for the user, and returns a private key of the pair of keys to the user. The public key is stored by the electronic bill management system, to verify the user identity.

In an exemplary scenario, the bill issuance request of the first user may be triggered and generated by the user on a client or a webpage provided by the electronic bill management system, and sent to a gateway of the electronic bill management system, so that the gateway can receive the bill issuance request of the first user. Because the gateway may have check and isolation effects, the information security can be improved.

Referring back to FIG. 2, the electronic bill management method according to an exemplary embodiment includes operation 202:

202. Generate, based on the original bill information, a first bill account corresponding to the first user, and store account information of the first bill account to an account table in the electronic bill management system.

In an exemplary embodiment, the first bill account is used to identify an electronic bill issued for the first user, and may be an eigenvalue used to uniquely identify the electronic bill, for example, a hash value. The account information of the first bill account is used to describe the electronic bill, and is not limited to information such as bill holder information, asset information, a date of issue, a due date, an account state, and a transaction result. The bill holder information, the asset information, the date of issue, and the due date may be directly obtained according to the original bill information; the transaction result may be added in a subsequent transaction process, such as a signing rejection message; and the account state may be set to a normal holding state. It should be noted that, the electronic bill management system may modify the account state in the account information of the first bill account in the account table according to a transaction process of the bill transaction. The account state includes a transferred state, a discounted state, a cashed state, a normal holding state, or the like.

To ensure the authenticity of the commercial bill, after operation 201, the electronic bill management system may query, according to the bill identifier in the original bill information, for commercial bill information corresponding to the bill identifier, and perform operation 202 if the commercial bill information matches the original bill information, the bill identifier may be a bill number. During the query, the electronic bill management system may query a banking system for the commercial bill information corresponding to the bill identifier. The banking system may be an Electronic Commercial Draft System (ECDS). If the commercial bill information is found successfully, and the commercial bill information matches the original bill information filled by the first user, operation 202 may be performed; otherwise, the bill issuance request of the first user may be rejected.

It should be noted that, in an exemplary embodiment, the electronic bill corresponding to the commercial bill is issued based on the commercial bill of the first user, and a plurality of manners may be used during the issuance. For example, an electronic bill consistent with the commercial bill may be directly issued, or the commercial bill may be transferred or pledged to the electronic bill management system by the user. As a drawer, the electronic bill management system issues an electronic bill equivalent to the commercial bill.

In an exemplary scenario, a bill account generation process may be completed in an account table by a server in a bill management system, to manage an electronic bill of a user by using the bill account.

Referring back to FIG. 2, the electronic bill management method according to an exemplary embodiment includes operation 203:

203. Generate a second block based on the bill issuance request, the first bill account, and a block header eigenvalue of a first block in a block chain in the electronic bill management system, the first block being a previous block of the second block in the block chain, and the second block being used to record a bill issuance event of the first user.

In an exemplary embodiment, the electronic bill management system may obtain the first block from the block chain, then obtain all information in a block header of the first block, obtain the block header eigenvalue of the first block based on all the information in the block header of the first block, obtain event information of a bill issuance request to be stored to a block body of the second block, then perform eigenvalue calculation on the event information of the bill issuance request and the first bill account, to obtain a block body eigenvalue of the second block, and further store the block header eigenvalue of the first block, and the block body eigenvalue (which may further include a version number, a difficulty value, and a timestamp) of the second block to the block header of the second block.

In an exemplary embodiment, the event information of the bill issuance request and the first bill account are further stored to the block body of the second block, to generate the second block. By using this processing manner, the second block is related to the first block by using the block header eigenvalue of the first block, so as to achieve the objective of connecting the blocks in the block chain in series, so that the tampering for any information in the blocks can be detected by tracing a block header eigenvalue of a previous block stored in a block header of the block, thereby ensuring the security of the transaction information.

The event information may include an event type (such as, a bill issuance request event or a transaction request event) and asset information involved in this event. Event information in subsequent transaction processes is similar.

It should be noted that, to help subsequently collect evidence of transaction information, and prevent a malicious user from denying or tampering the transaction information, the message exchanged in a bill transaction process may further carry signature information, and the signature information is obtained by signing the message by a message sending user. The private key used by the user for signing is issued by the electronic bill management system. Each user corresponds to a unique pair of keys, and a public key in the pair of keys is stored by the electronic bill management system, for the electronic bill management system to verify the user identity.

In an exemplary embodiment, a process of pledging or transferring the commercial bill to the electronic bill management system may also used as a transaction process. Therefore, the bill issuance request may also carry the signature information of the first user. When the second block is generated, the electronic bill management system may also perform eigenvalue calculation on the event information of the bill issuance request, the original bill information, the first bill account, and the signature information, to obtain a block body eigenvalue, and further store information such as the block body eigenvalue, and the block header eigenvalue of the first block to the block header of the second block.

The electronic bill system may further store the event information of the bill issuance request, the original bill information, the first bill account, and the signature information to the block body of the second block. The message exchanged in the following bill transaction process is similar, and may also carry signature information of the sending user for the message.

In an exemplary scenario, a block generation process may be completed on a block chain by a server in a bill management system, to record this bill issuance event.

Referring back to FIG. 2, the electronic bill management method according to an exemplary embodiment includes operation 204:

204. Send an issuance success message to the first user, the issuance success message carrying the first bill account.

In an exemplary scenario, the operation may be that the server in the electronic bill management system sends the issuance success message to the gateway, and then the gateway sends the issuance success message to the first user, so that when receiving the issuance success message, the first user can correspondingly view the account information based on the bill account carried by the issuance success message.

Figure 6:
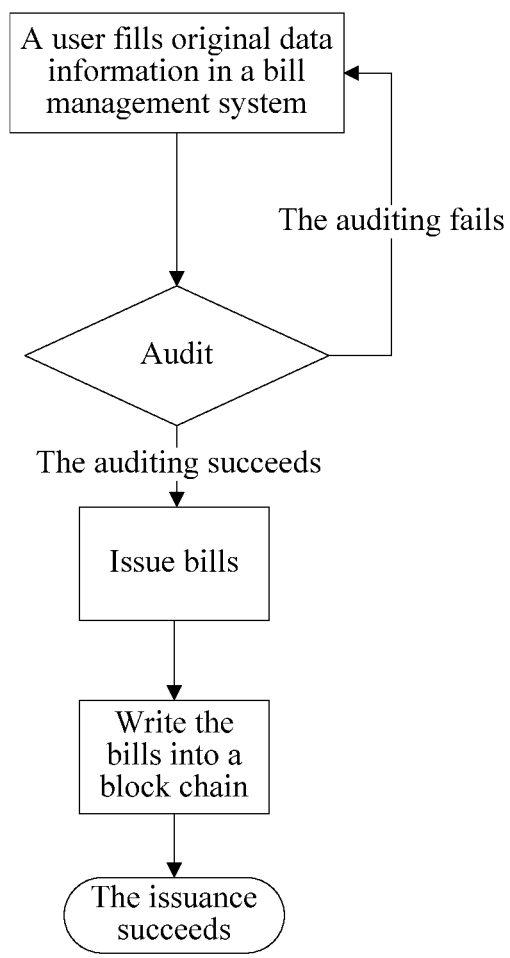
FIG. 6 is a flowchart illustrating a bill issuance process according to an embodiment.

Based on the foregoing issuance process, a bill issuance process according to an exemplary embodiment may be performed. FIG. 6 is a flowchart illustrating a bill issuance process according to an embodiment.

In the bill issuance process according to an exemplary embodiment, the original bill information input in the electronic bill management system by the user may be obtained, and the original bill information is audited in the query process of commercial bill information in operation 202. If the auditing succeeds, this issue event may be written into the block, to complete the issuance process, and if the auditing does not succeed, it is determined that the issuance fails, and the user may be notified to restart the issuance process.

The foregoing content relates to the issuance process of an electronic bill, and the bill transaction process further involves processes such as bill transferring and bill discounting.

Referring back to FIG. 2, the electronic bill management method according to an exemplary embodiment includes operation 205, which is a bill transaction process:

205. Perform a bill transaction based on a message exchanged between the first user and the second user, when receiving the bill transaction request of the first user and if the bill transaction request is a full bill transaction request.

The bill transaction request refers to a request that a user transacts with other users based on an electronic bill held by the user. For example, the bill transaction request is a bill transfer request or bill discounting request. The bill transaction request may further carry transaction asset information requested to transact and signature information of the first user for the bill transaction request. The transaction asset information is used to indicate an asset amount to be transacted by the first user in the transaction. The signature information may be stored to the block chain by the electronic bill management system when the transaction succeeds, to verify the identity of the first user when evidence of transaction information is collected subsequently. The second user refers to a user in the electronic bill management system except the first user, and the second user may be determined according to the first user, for example, may be determined based on the user identifier of the second user filled by the first user when the first user initiates the bill transaction request.

In the operation, when receiving the bill transaction request, the electronic bill management system may determine the type of the bill transaction request based on the first bill account carried in the bill transaction request and the transaction asset information carried in the bill transaction request. For example, the type of the bill transaction request may be determined by using the following method. The electronic bill management system may query, according to the first bill account carried in the bill transaction request, for asset information corresponding to the first bill account, and compare an asset amount corresponding to the asset information with a transaction asset amount corresponding to the transaction asset information carried in the bill transaction request. If they are equal, the type of the bill transaction request is determined as the full bill transaction request, and further the bill transaction is performed based on the message exchanged between the first user and the second user.

After determining the type of the bill transaction request, the electronic bill management system may perform a bill transaction process. The bill transaction process may be specifically: The electronic bill management system sends a first signing request message to the second user, the first signing request message being used to instruct to sign for the first bill account; when receiving a first signing confirmation message of the second user, the electronic bill management system may determine that the bill transaction succeeds; and when receiving a first signing rejection message of the second user, the electronic bill management system may determine that the bill transaction fails.

The first signing request message may further carry the first bill account. Based on the first bill account carried in the first signing request, the second user may view the account information, and the like of the first bill account by using the first bill account, to audit the first bill account to be signed for. The first signing confirmation message may carry the signature information of the second user for the first signing confirmation message, and the signature information may be stored to the block chain by the electronic bill management system when the transaction succeeds, to verify the identity of the second user when evidence of transaction information is collected subsequently. In the foregoing specific process, when receiving the first signing request, the second user may select whether to sign, and may send the first signing confirmation message to the electronic bill management system based on a signature of the second user for the first bill account. The foregoing bill transaction process may be applied to the bill transfer process, and when the bill transaction request is a bill discounting request, the second user may further transfer amounts to the first user offline at any moment before or after the signing, to complete the discounting process.

It should be noted that, to facilitate the signing process of the second user when the transaction succeeds, after receiving the bill transaction request, the electronic bill management system may generate a corresponding second bill account in the account table for the second user. The second bill account is used to identify the electronic bill signed by the second user. In this case, bill holder information in the account information of the second bill account may be the user identifier of the second user, and other information in the account information may not be set temporarily, or is set to a default value.

In an exemplary embodiment, to make the transaction be performed legally, when receiving the bill transaction request, the electronic bill management system may check, according to the bill account carried in the bill transaction request, whether the bill transaction request matches the bill account, continue the transaction if the bill transaction request matches the bill account, and end the transaction if the bill transaction request does not match the bill account.

In the foregoing check process, the electronic bill management system may perform checking according to at least one piece of information in the account information of the bill account. For example, whether the transaction asset information carried in the bill transaction request matches the asset information may be checked according to the asset information in the account information of the bill account. For example, if the asset amount of the transaction asset information is not greater than the asset amount of the asset information, it indicates that the bill transaction request is reasonable, and it is determined that the bill transaction request matches the bill account; otherwise, it is determined that the bill transaction request does not match the bill account.

For another example, whether the request time of the bill transaction request matches the due date may be checked according to the due date in the account information of the bill account. For example, if the request time of the bill transaction request is not later than the due date, it indicates that the bill transaction request is reasonable, and it may be determined that the bill transaction request matches the bill account; otherwise, it is determined that the bill transaction request does not match the bill account.

In addition, the electronic bill management system may further perform checking according to the account state in the account information of the bill account, when the account state is a normal holding state, may determine that the bill transaction request matches the bill account, and when the account state is an account state except the normal holding state, may determine that the bill transaction request does not match the bill account. In an exemplary embodiment, to further improve the reasonability of the transaction, only when all the foregoing information matches the bill transaction request, it may also be determined that the bill transaction request corresponds to the bill account; otherwise, it is determined that the bill transaction request does not match the bill account.

When the bill transaction request is a bill discounting request, to improve the asset circulation efficiency, and ensure the benefits of the first user to a great extent, the electronic bill management system may also initiate bill bidding for the first user before the transaction operation is performed. The bill bidding process may be performed as in the following manner: When it is determined that the bill transaction request is a bill discounting request, the electronic bill management system sends a bill bidding message corresponding to the first bill account to users in the electronic bill management system, and uses, according to bidding feedback information, a user having the highest bid for the first bill account as a second user.

In the bill bidding solution, the electronic bill management system may generate a bill bidding message based on the first bill account carried in the bill discounting request. The bill bidding message carries the first bill account, and may include the user identifier of the first user, the asset information in the account information of the first bill account, and the due date. Further, the electronic bill management system may send the bill bidding message to the users by using a pushing manner. The electronic bill management system may obtain feedback information of each user for the bill bidding message in this bill bidding process. The feedback information includes at least amount information that the users promise to discount, so that the electronic bill management system may use a user who promises to discount the highest amount as a second user. In an exemplary embodiment, the bill bidding process should be set with a bidding time, and the bidding time may be set by the first user or the electronic bill management system, but cannot be later than the due date.

In an exemplary scenario, the user may send the bill transaction request to the gateway in the electronic bill management system by using the client, and the gateway sends the bill transaction request to the server in the bill management system, so that the server provides a transaction service for the user based on the bill transaction request. In an exemplary embodiment, in the bill bidding process, the bill bidding may also be initiated by the gateway, and the second user is determined, to further send the user identifier of the second user and the bill transaction request of the first user to the server.

Referring back to FIG. 2, the electronic bill management method according to an exemplary embodiment includes operation 206:

206. Update bill accounts in the account table when the bill transaction succeeds, and generate, in the block chain, a block used to record a bill transaction of the first user and a block used to record a bill transaction of the second user.

In an exemplary embodiment, to clearly record the transaction process, the electronic bill management system may update bill accounts of both parties of the transaction in the account table when the bill transaction succeeds. To record each transaction beyond dispute, and prevent a malicious user from denying or tampering the transaction, the electronic bill management system may further generate blocks used to record the bill transaction. In an exemplary embodiment, the specific processes of updating the bill account and generating the blocks are not limited. For example, when the bill transaction succeeds, the electronic bill management system may update the first bill account in the account table and the second bill account of the second user, and generate a third block and a fourth block in the block chain. The third block is used to record this bill transaction event of the first user, and the fourth block is used to record this bill signing event of the second user.

When the bill account is being updated, an example case in which the bill transaction request is a bill transfer request is described. The electronic bill management system may modify the bill state of the account information of the first bill account into a transferred state, thereby indicating that the electronic bill identified by the first bill account has been transferred, set asset information in the account information of the generated second bill account to asset information corresponding to the original first bill account (if the second bill account has not be generated, the second bill account may also be generated at this time), and set the account state in the account information of the second bill account to a normal holding state.

The block generation process is similar to the second block generation process. A block body of the third block may store event information of the bill transaction request, the first bill account, and the signature information of the first user for the bill transaction request. A block header of the third block may store a block header eigenvalue of a previous block, a block body eigenvalue of the third block, and the like. A block body of the fourth block may store event information of the first signing confirmation message, the second bill account, and the signature information of the second user for the first signing confirmation message. A block header of the fourth block may store a block header eigenvalue of a previous block and a block body eigenvalue of the fourth block.

Both the bill account update process and the block generation process involved in the operation 206 may be completed by the server in the electronic bill management system.

Referring back to FIG. 2, the electronic bill management method according to an exemplary embodiment includes operation 207:

207. Send a transaction success message to the second user.

After the bill transaction based on the foregoing any manner succeeds, the electronic bill management system may send a corresponding transaction success message to the second user. The transaction success message may carry the transacted second bill account corresponding to the second user, or a fourth bill account corresponding to the second user, so that the second user can view the signed bill account. In an exemplary embodiment, the electronic bill management system may further send a corresponding transaction success message to the first user. The transaction success message may carry the transacted first bill account, or the first bill account and the third bill account, so that the first bill account views the transacted first bill account, or the third bill account storing residual assets.

In an exemplary scenario, the server in the electronic bill management system may send the transaction success message to the gateway, and then the gateway sends the transaction success message to the client in which the user resides.

Figure 7:
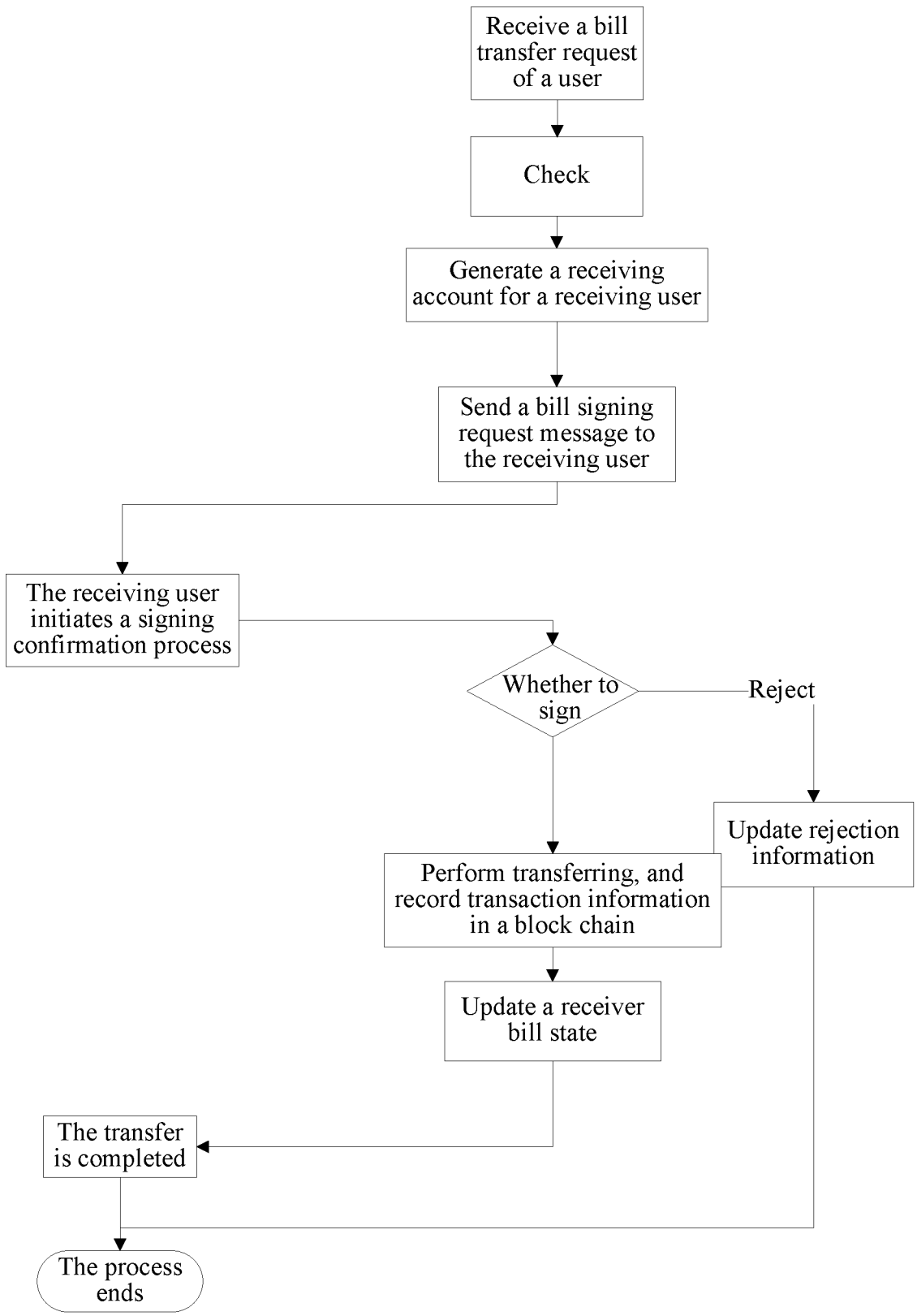
FIG. 7 is a flowchart illustrating a bill transfer process according to an embodiment.

Based on the foregoing transaction process, in an example case in which the bill transaction request is a bill transfer request is described, a bill transfer process according to an exemplary embodiment may be performed. FIG. 7 is a flowchart illustrating a bill transfer process according to an embodiment.

In the bill transfer process, when receiving a bill transfer request of the first user, the bill management system checks the bill transfer request of the first user, generates a second bill account of the second user if the checking succeeds, and sends a bill signing request to the second user. If the second user agrees to sign, the bill management system separately updates the bill accounts of the first user and the second user, and generates a block for recording the transaction information. If the second user rejects to sign, the bill management system updates a signing rejection message to the first bill account.

Figure 8:
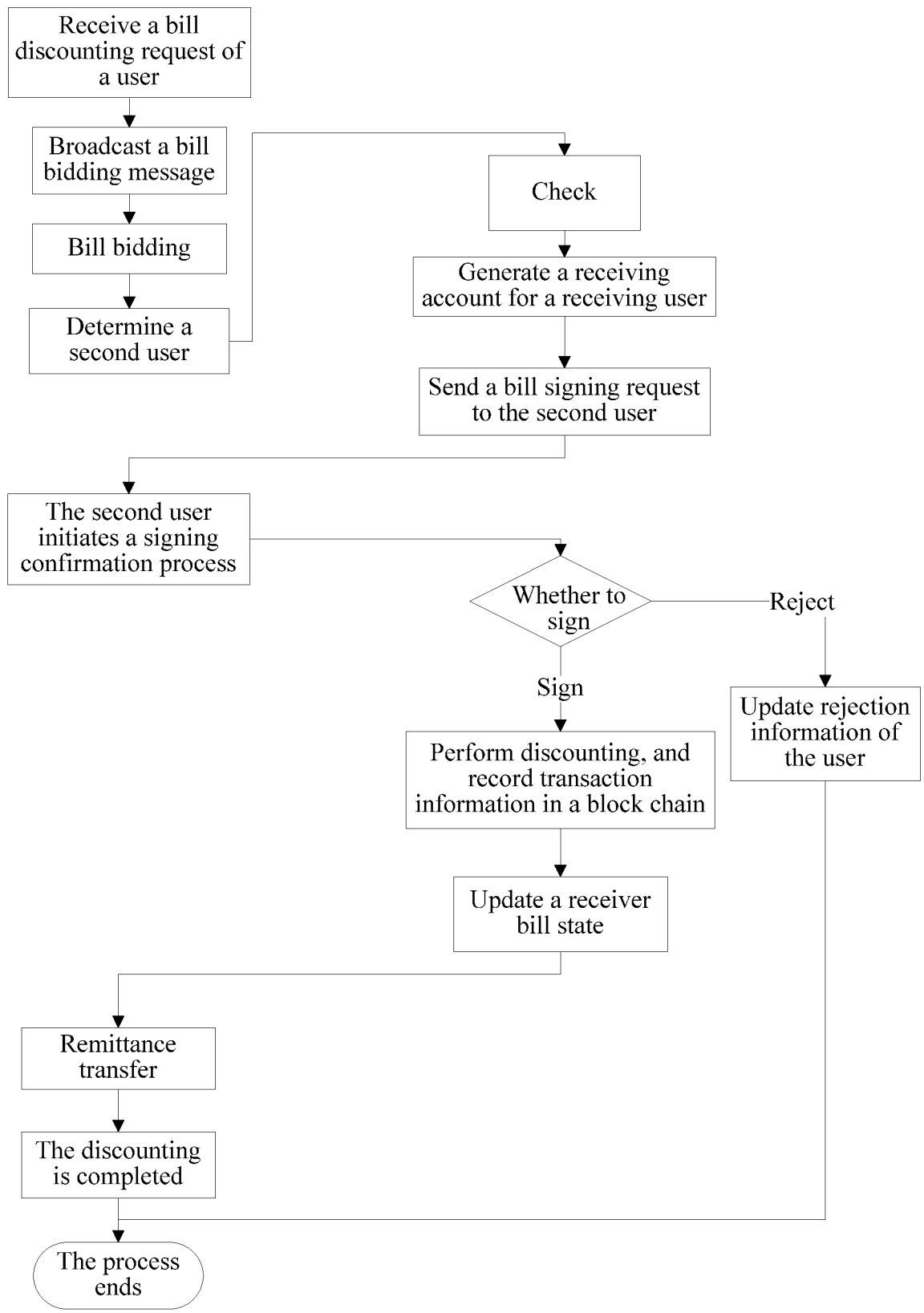
FIG. 8 is a flowchart illustrating a bill discounting process according to an embodiment.

In an example case in which the bill transaction request is a bill discounting request in the foregoing transaction process, a bill discounting process according to an exemplary embodiment may be performed. FIG. 8 is a flowchart illustrating a bill discount process according to an embodiment. In the bill discounting process, when receiving the bill discounting request of the first user, the bill management system initiates bill bidding, checks the second user after determining the second user, generates a second bill account of the second user if the checking succeeds, and sends a bill signing request to the second user. If the second user agrees to sign, the bill management system separately updates the bill accounts of the first user and the second user, and generates a block for recording the transaction information. If the second user rejects to sign, the bill management system updates a signing rejection message to the first bill account.

To provide flexible and various transaction manners, and improve the asset circulation efficiency, the electronic bill management system supports the user to transact all assets corresponding to the electronic bill (or a full amount of the electronic bill), and also supports the user to transact some assets of the electronic bill (or a partial amount of the electronic bill; for example, if a user holds an electronic bill corresponding to a relatively large asset amount, the user may transact a partial asset with other users, so that more users may transact with the user in an asset capability range).

Therefore, the foregoing operations 205 to 207 are related operations when a full bill transaction is performed in an exemplary embodiment. In addition to the case of the foregoing full bill transaction request, an example case may also exist, in which when receiving the bill transaction request of the first user, if the bill transaction request is a partial bill transaction request, the electronic bill management system may generate, based on transaction asset information carried in the partial bill transaction request, a third bill account that is in the account table and that corresponds to the first user, and further send a second signing request message to the second user, the second signing request message being used to instruct to sign for a partial first bill account.

The type of the bill transaction request may also be determined according to the first bill account carried in the bill transaction request and the transaction asset information carried in the bill transaction request. For example, it may be determined by using the following method: If an asset amount corresponding to the asset information is greater than a transaction asset amount corresponding to the transaction asset information, it may be determined that the bill transaction request is a partial bill transaction request. To facilitate the signing process of both parties of the transaction when the transaction succeeds, the electronic bill management system may generate a third bill account that is in the account table and that corresponds to the first user. In this case, the bill holder information in the account information of the third bill account may be the user identifier of the first user, and other information may not be set temporarily. Then, the electronic bill management system may send a second signing request message to the second user. The second signing request message carries the first bill account and the transaction asset information, so that the second user audits the partial first bill account to be signed for.

When the bill transaction request is a partial bill transaction request, the electronic bill management system may update the bill account and generate the block by using the following manner: When receiving a second signing confirmation message of the second user, the electronic bill management system updates the first bill account, the third bill account, and the fourth bill account of the second user in the account table, and generates a sixth block and a seventh block in the block chain. The sixth block is used to record this bill transaction event of the first user, and the seventh block is used to record this bill signing event of the second user.

The second signing confirmation message may carry signature information of the second user for the second signing confirmation message, and the signature information may be stored to the block chain by the bill management system when the transaction succeeds, to verify the identity of the second user when evidence of transaction information is collected subsequently.

An example case in which the transaction asset information carried in the partial bill transaction request of the first user indicates an asset of 80, and the asset information of the first bill account indicates an asset of 100 is described. When receiving the second signing confirmation message of the second user, the electronic bill management system determines that the second user confirms to sign for an asset of 80. Therefore, the electronic bill management system may modify the asset information of the first bill account into asset of 0, modify the account state into a transferred state, update the asset information of the third bill account to an asset of 20, update the account state to a normal holding state, update the asset information of the fourth bill account (which may be generated and set for the second user when the partial bill transaction request is received) to an asset of 80, and update the account state to the normal holding state.

In the block generation process, a block body of the sixth block may store event information of the partial bill transaction request, the first bill account, the third bill account, and signature information of the first user for the partial bill transaction request. A block header of the sixth block may store a block header eigenvalue of a previous block and a block body eigenvalue of the sixth block. A block body of the seventh block may store event information of a second signing confirmation message, a fourth bill account, and signature information of the second user for a second signing confirmation message. A block header of the seventh block may store a block header eigenvalue of a previous block and a block body eigenvalue of the seventh block.

In an exemplary embodiment, the second user may reject to sign for the partial first bill account. In this case, the processing manner for the electronic bill management system is not specifically limited in an exemplary embodiment. For example, when receiving a second signing rejection message of the second user, the electronic bill management system deletes the third bill account from the account table. For example, due to the transaction failure, the electronic bill management system may maintain the original first bill account. In an exemplary embodiment, if the fourth bill account has been generated, the electronic bill management system may also delete the fourth bill account from the account table.

Figure 9:
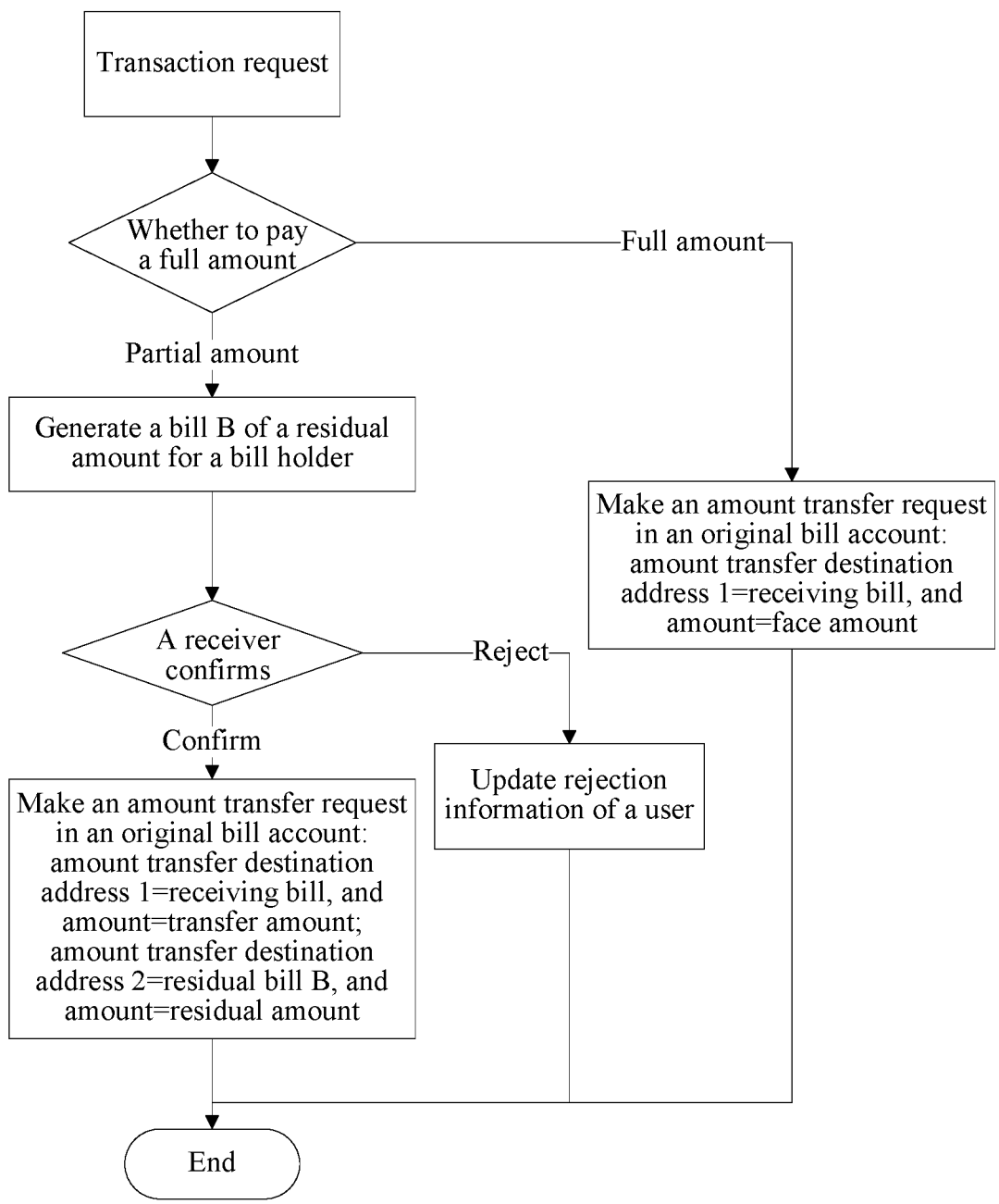
FIG. 9 is a flowchart illustrating a bill splitting process according to an embodiment.

Based on the foregoing bill splitting process, a bill splitting flowchart according to an exemplary embodiment may be performed. FIG. 9 is a flowchart illustrating a bill splitting process according to an embodiment. In the splitting process, an example in which a bill account of an initiator is A, a residual bill account of the initiator is B, and a bill account of a receiver is C is used for description. When determining that the bill transaction request is a full bill transaction request, the electronic bill management system may transfer all asset amounts in A to C. When determining that the bill transaction request is a partial bill transaction request, the electronic bill management system may generate B, and send a bill signing request to a receiver user. If the receiver user agrees to sign, transfer asset amounts that are in A and that are equivalent to transaction asset information to C, and transfer asset amounts remaining in A after the transaction to B, and if the receiver user rejects to sign, maintain the asset amounts in A unchanged, and update a signing rejection message of the receiver to A.

The foregoing bill transaction processes all of involved interactions between users, and an actual bill transaction process may further involve that the electronic bill management system completes a cashing process for the first user. The bill cashing process is: When detecting that the first bill account reaches a cashing deadline, the electronic bill management system sends a bill cashing request to the first user, and returns a cashing confirmation message if the first user confirms to perform cashing. The electronic bill management system may cash, for the first user, an asset corresponding to the first bill account when receiving the cashing confirmation message of the first user, update the first bill account in the account table when the cashing process is completed, generate a fifth block based on the cashing confirmation message and the block header eigenvalue of the previous block, and further send a cashing success message to the first user.

The cashing confirmation message may carry signature information of the first user for the cashing confirmation message, and the signature information may be stored to the block chain by the bill management system when the cashing succeeds, to verify the identity of the first user when evidence of transaction information is collected subsequently.

Figure 10A:
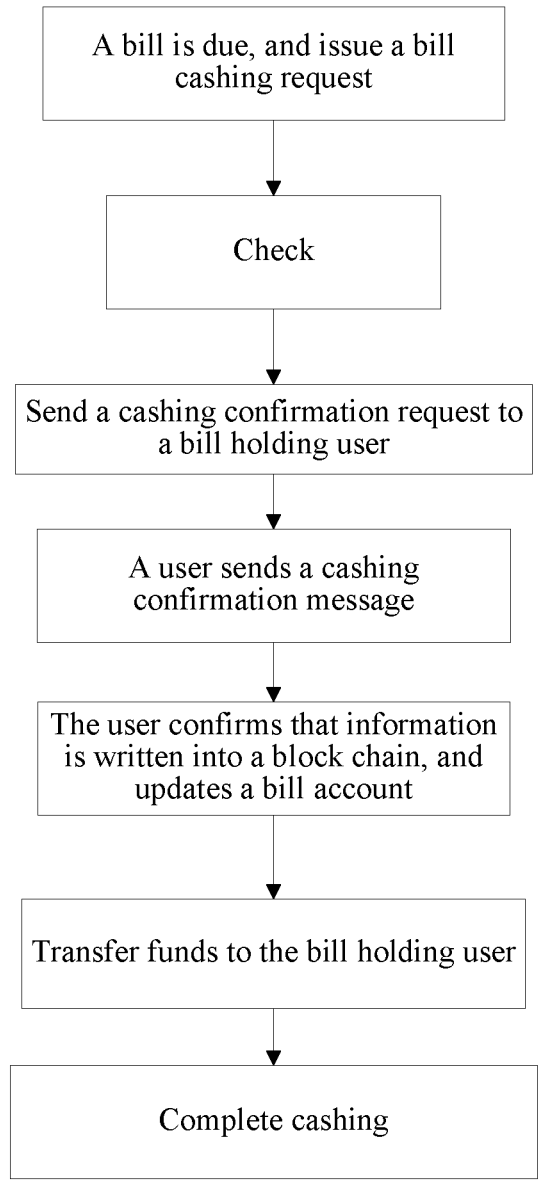
FIG. 10A is a flowchart illustrating a bill cashing process according to an embodiment.

FIG. 10A is a flowchart illustrating a bill cashing process according to an embodiment. Referring to FIG. 10A, in the bill cashing process according to an embodiment, the electronic bill management system may detect due dates of bill accounts regularly, determine, according to the due dates, whether the current date matches a cashing deadline (not limited to the day of the due date or ten days before the due date), and if the current date matches the cashing deadline, determine that the first bill account reaches the cashing deadline. The electronic bill management system may send a bill cashing request to the first user, the bill cashing request carrying the first bill account. When receiving the bill cashing request, the first user may audit account information of the first bill account, and send a cashing confirmation message to the electronic bill management system.

When receiving the cashing confirmation message, the electronic bill management system may directly cash, for the first user, an asset amount corresponding to the current first bill account. After the cashing succeeds, the commercial bill transferred to the electronic bill management system by the first user belongs to the electronic bill management system.

Alternatively, if the first user pledges the commercial bill to the electronic bill management system, the electronic bill management system may first locate original bill information from the block chain according to the first bill account, locate an actual debtor of the commercial bill according to a bill identifier in the original bill information, demand an asset from the actual debtor, and cash the demanded asset to the first user. After the cashing succeeds, the electronic bill management system may modify a bill state in the account information of the first bill account in the account table into a cashed state, and generate a fifth block. A block body of the fifth block may store event information of the cashing confirmation message, the first bill account, and signature information of the first user for the cashing confirmation message. A block header of the fifth block may store a block header eigenvalue of a previous block and a block body eigenvalue of the fifth block.

It should be noted that, when the cashing process is started, to avoid system errors, the electronic bill management system may also perform a check process. For example, when detecting that the first bill account reaches the cashing deadline, the electronic bill management system checks whether the first bill account meets a cashing condition, continues the transaction if the first bill account meets the cashing condition, and ends the transaction if the first bill account does not meet the cashing condition. The cashing condition may include, but not limited to: The account state in the account information of the first bill account is a normal holding state, the asset information is not 0, or the due date is not earlier than the current date.

In addition, it should be further noted that, in the transaction processing processes, the electronic bill management system may receive a signing rejection message of any user for a to-be-signed-for bill account or a cashing rejection message for a to-be-cashed bill account. When the user rejects, to clearly record the event of the transaction failure, the electronic bill management system may also correspondingly record the to-be-signed-for bill account or the to-be-cashed bill account. That is, when receiving the signing rejection message of any user for the to-be-signed-for bill account, the electronic bill management system updates the signing rejection message of the user to the to-be-signed-for bill account in the account table; or when receiving the cashing rejection message of any user for the to-be-cashed bill account, the electronic bill management system updates the cashing rejection message of the user to the to-be-cashed bill account in the account table. The signing rejection message may be stored to a transaction result in the account information of the bill account.

In an exemplary scenario, the gateway in the electronic bill management system may detect the cashing deadline, trigger the cashing process, and send the cashing initiating message to the server. When receiving the cashing initiating message, the server may perform a check process, and send a bill cashing request to the gateway if the checking succeeds. The gateway sends the bill cashing request to a client in which the first user resides. The client may send a cashing confirmation message or a cashing rejection message of the first user to the gateway. The gateway sends, to the server, a message sent by the first user, so that the server completes the cashing process based on the message.

In the embodiments, a first bill account corresponding to a first user may be generated in an account table based on original bill information of the first user, and a second block may be generated based on a bill issuance request of the first user, the first bill account, and a block header eigenvalue of a first block in a block chain. Through the foregoing processes, not only account information can be managed by using the account table, but also any information in the block, when being tampered, can be detected by using a next block and based on an association relationship between front and back blocks in the block chain, to prevent a malicious user from tampering or denying an issued electronic bill, thereby ensuring the security and reliability of the transaction information.

Figure 10B:
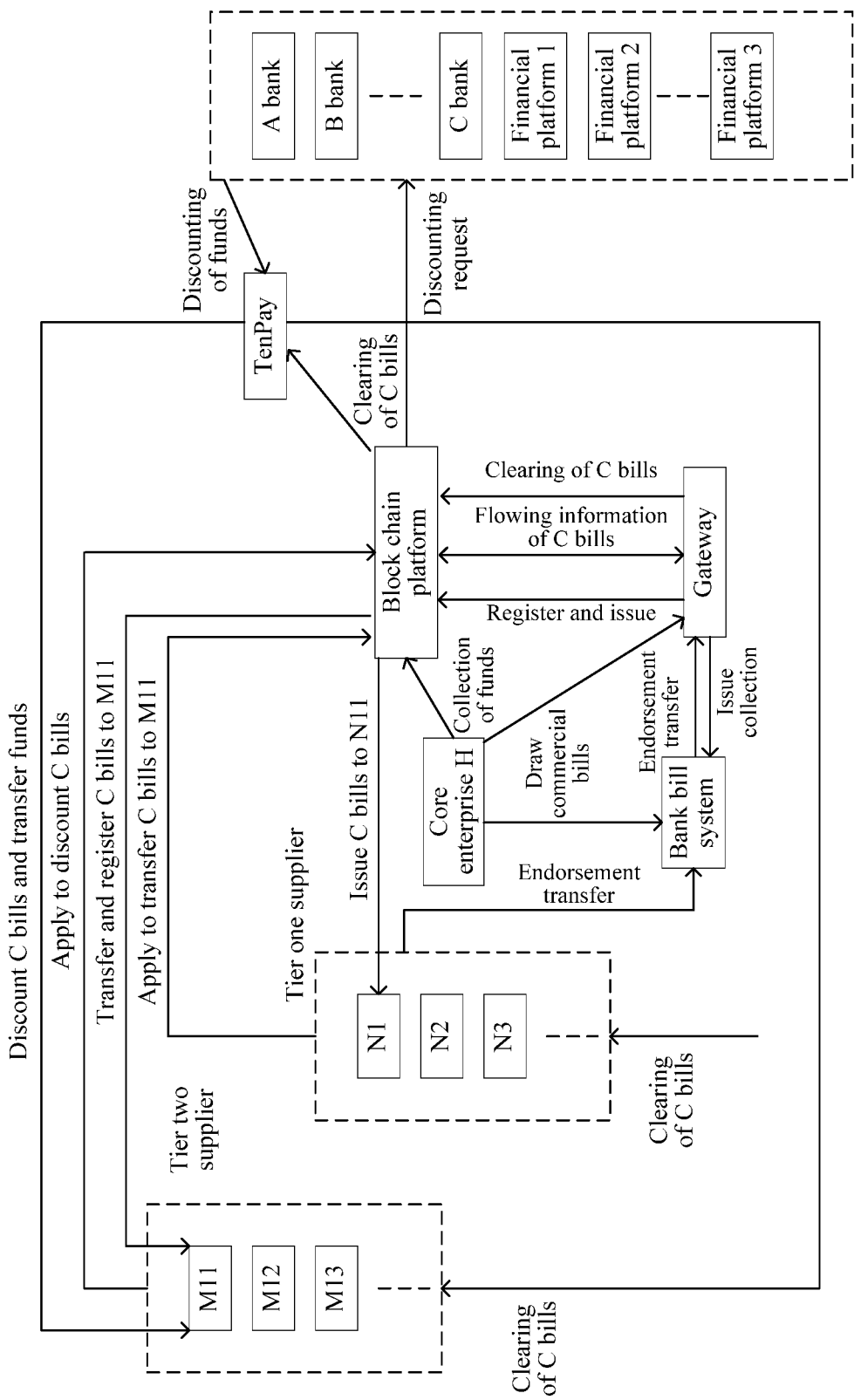
FIG. 10B is a flowchart illustrating a bill transaction process according to an embodiment.

FIG. 10B is a flowchart illustrating a bill transaction process according to an embodiment. Based on the bill flowing process of the embodiments, the following describes the bill transaction process with reference to FIG. 10B as an example. In an example case of the bill transaction process, a core enterprise H purchases a batch of goods of a tier one supplier N, but has not made the payment. The enterprise H may draw a commercial bill through a bank bill system, and the bank bill system sends a commercial bill signing request to the tier one supplier N. The tier one supplier N may sign through an E-bank, to obtain the commercial bill.

Further, the tier one supplier N sends a bill issuance request to an electronic bill management system. When receiving the bill issuance request, a gateway in the electronic bill management system may apply to the bank bill system to modify the holder of the commercial bill of the tier one supplier N into the gateway. That is, the tier one supplier N transfers the commercial bill to the gateway. Correspondingly, the electronic bill management system issues an electronic bill for the gateway, and writes an issuance event into the block chain, to determine that the issuance succeeds. Then, the tier one supplier N may transfer, discount, or split the electronic bill by using the electronic bill management system. Moreover, the gateway of the electronic bill management system may automatically detect a cashing deadline of the electronic bill. Once the cashing deadline is due, the gateway may actively initiate a cashing process, to cash, for the tier one supplier N, an asset corresponding to the electronic bill.

Figure 10C:
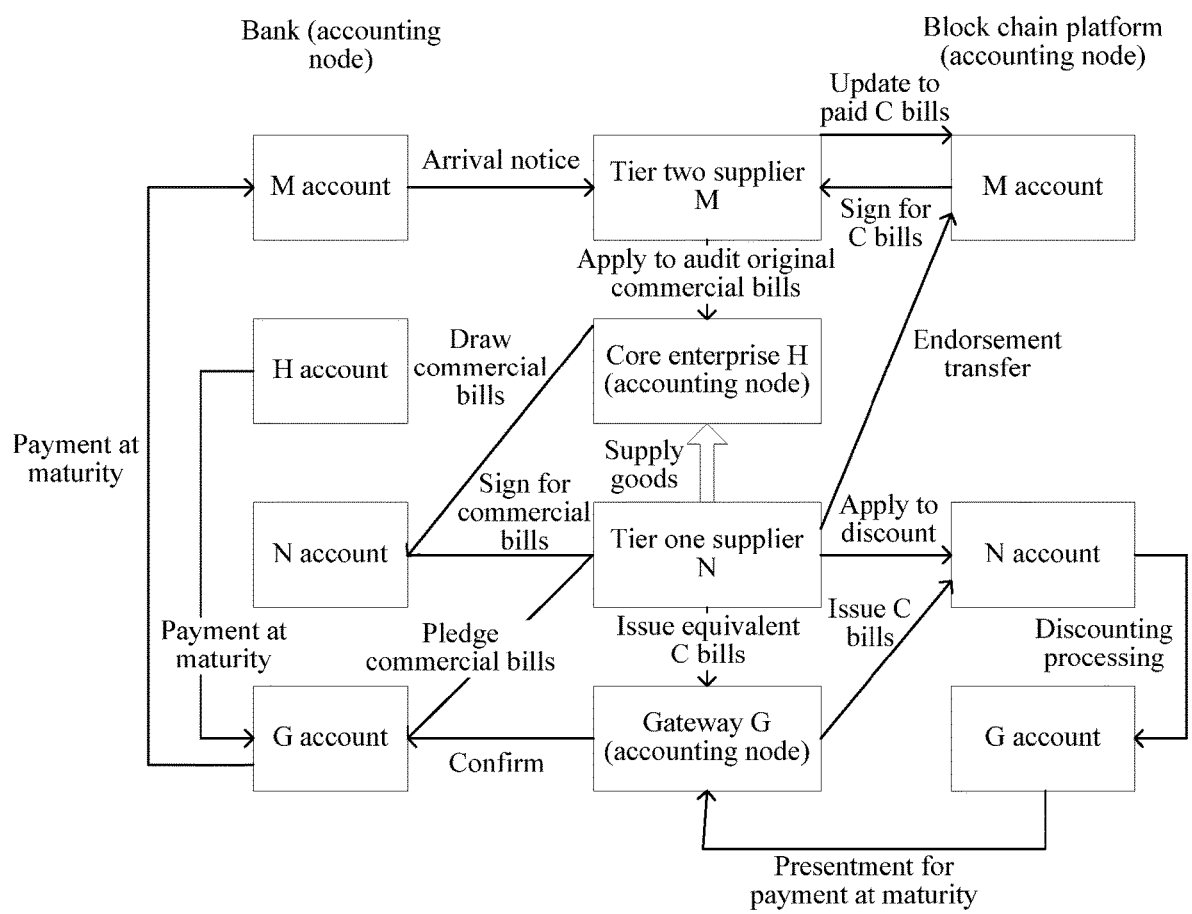
FIG. 10C is a flowchart illustrating a bill transaction process according to an embodiment.

The foregoing transaction processes may be separately performed based on accounting nodes of users on a bank side and bill accounts of accounting nodes on a block chain platform side. As shown in FIG. 10C illustrating a bill transaction process according to an embodiment, the processes such as commercial bill signing, commercial bill pledging, and electronic bill transfer may all correspond to interactions between the bill accounts of the users of both parties of the transaction.

According to one aspect of an exemplary embodiment, because once the electronic bill is registered and linked in the block chain, a subsequent circulation operation may not rely on an original electronic commercial draft system, a user can still transfer or discount the electronic bill on the electronic bill system without owning an E-bank account, and the asset amount during the transaction may be any asset amount held by the user. A user performing the transaction is not limited to an enterprise user, a personal user, a bank user, or the like, so that the transaction process of the electronic bill is not limited, and therefore, the electronic bill has strong circulation.

According to another aspect of an exemplary embodiment, based on the bill splitting process, bills are transacted in a social propagation form. The electronic bill may be expanded from the core enterprise H and the tier one supplier N to a business partner of N, that is, a tier two supplier M, thereby implementing bill splitting and payment at any amount.

According to another aspect of an exemplary embodiment, because any node having an electronic bill resource may become a catalyst of the asset circulation (such as a bank, a core enterprise, a supplier, and a bill transaction organization that can accept the bill transaction), and therefore, the entire transaction process has high openness, driving the asset circulation efficiency.

According to another aspect of an exemplary embodiment, decentralized storage may be achieved by using the feature of the block chain, and the transaction information may also be stored as a plurality of nodes, thereby effectively preventing the transaction information from being tampered or denied, and the transaction information is traceable all the way.

In addition, the embodiments provide a platform for users to freely transact electronic bills. When the bill transaction request of the first user is received, based on the message exchanged between the first user and the second user, both parties may perform a free transaction. When the transaction succeeds, not only the bill account in the account table may be updated, but also a block used to record the transaction is generated in the block chain, thereby further ensuring the security and reliability of the transaction information.

In addition, the embodiments provide specific processes for updating a bill account and generating a block, and the bill accounts separately corresponding to the first user and the second user can be updated to reasonably manage the bill accounts of both parties of the transaction. In addition, not only a third block used to record this bill transaction event of the first user may be generated, but also a fourth block used to record this bill signing event of the second user may be generated. Therefore, roles of both parties of the transaction in the transaction can be reasonably recorded, and the transaction process of the electronic bill from the first user to the second user is fully reflected.

In addition, to provide flexible and various bill transaction manners, and improve the asset circulation efficiency, the embodiments provide a specific method for splitting an electronic bill. An example splitting process may be performed in the following manner: When a bill transaction request is received, the type of the bill transaction request is determined, if the bill transaction request is a full bill transaction request, the bill transaction is performed based on the message exchanged between the first user and the second user; if the bill transaction request is a partial bill transaction request, a third bill account corresponding to the first user is generated based on transaction asset information carried in the partial bill transaction request, when the transaction succeeds, a transaction asset in the original first bill account may be transferred to a fourth bill account of the second user, and the residual asset may be transferred to the third bill account, and further the transaction information may be stored to the block chain. Not only the process in which the original electronic bill has been transacted, and split into two new electronic bills is completely recorded, but also the security of the transaction information is ensured.

In addition, the embodiments provide a simple processing method of the electronic bill management system when a user rejects to sign for a transaction asset of a partial first bill account. The method may be used to delete the third bill account, and maintain the account information of the original first bill account.

In addition, to provide flexible and various bill transaction manners, improve the asset circulation efficiency, and ensure the benefits of a bill holding user to a great extent, when the bill transaction request is a discount transaction request, a bill bidding message may be sent to users of the electronic bill management system for the user, and a user having the highest bid is used as the second user for transacting with the first user.

In addition, in the embodiments, whether the first bill account reaches the cashing deadline may also be intelligently detected, and when the first bill account reaches the cashing deadline, the asset is actively cashed for the first user, to intelligently manage the electronic bill for the first user in a user-friendly manner.

In addition, to help subsequently collect evidence of transaction information, and prevent a malicious user from denying or tampering the transaction information, the message exchanged in the bill transaction process further carries signature information obtained by signing the message by a message sending user, so that the user identity may be fairly and effectively verified according to the signature information of the user during evidence collection.

In addition, to ensure the accuracy of the original bill information provided by the user, in the embodiments, corresponding commercial bill information may be further queried for according to the bill identifier in the original bill information. When the two pieces of information match, the electronic bill is issued for the first user.

In addition, to prevent the user from initiating an unreasonable transaction request, and ensure that each transaction is legally performed, in the embodiments, whether the account information of the bill account matches the bill transaction request may be further checked when the bill transaction request is received, or when it is detected that the bill account reaches the cashing deadline.

In addition, even if the user rejects to sign for or cash the bill account, in the embodiments, the signing rejection message or the cashing rejection message may also be stored to a corresponding bill account, to clearly record the transaction that fails, and avoid denying of a malicious user.

Figure 11:
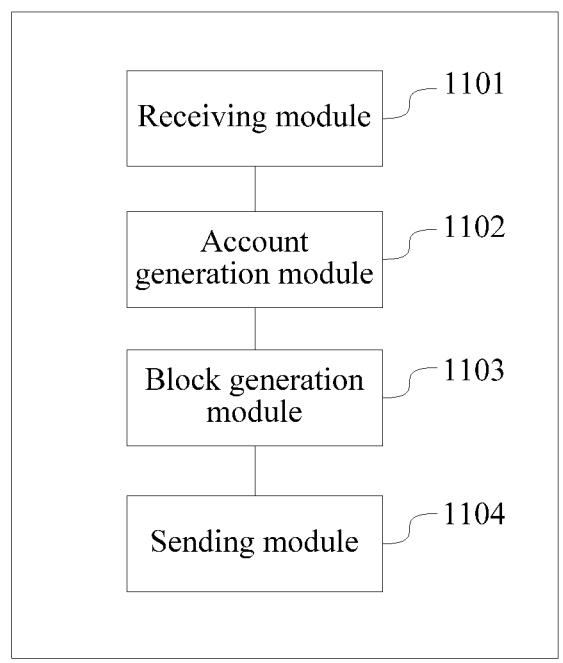
FIG. 11 is a block diagram of an electronic bill management apparatus according to an embodiment.

FIG. 11 is a block diagram of an electronic bill management apparatus according to an embodiment. Referring to FIG. 11, the apparatus specifically includes:

a receiving module 1101, configured to receive a bill issuance request of a first user, the bill issuance request carrying original bill information;

an account generation module 1102, configured to generate, based on the original bill information, a first bill account corresponding to the first user, and store account information of the first bill account to an account table in the electronic bill management system;

a block generation module 1103, configured to generate a second block based on the bill issuance request, the first bill account, and a block header eigenvalue of a first block in a block chain in the electronic bill management system, the first block being a previous block of the second block in the block chain, and the second block being used to record a bill issuance event of the first user; and a sending module 1104, configured to send an issuance success message to the first user, the issuance success message carrying the first bill account.

In an exemplary embodiment, not only a first bill account corresponding to a first user is generated in an account table based on original bill information of the first user, but also a second block is generated based on a bill issuance request of the first user, the first bill account, and a block header eigenvalue of a first block in a block chain. In an exemplary embodiment, not only account information can be managed by using an account table, but also any information in the block, when being tampered, can be detected by using a next block and based on an association relationship between front and back blocks in the block chain, to prevent a malicious user from tampering or denying an issued electronic bill. Therefore, the exemplary embodiments may ensure the security and reliability of the transaction information.

Figure 12:
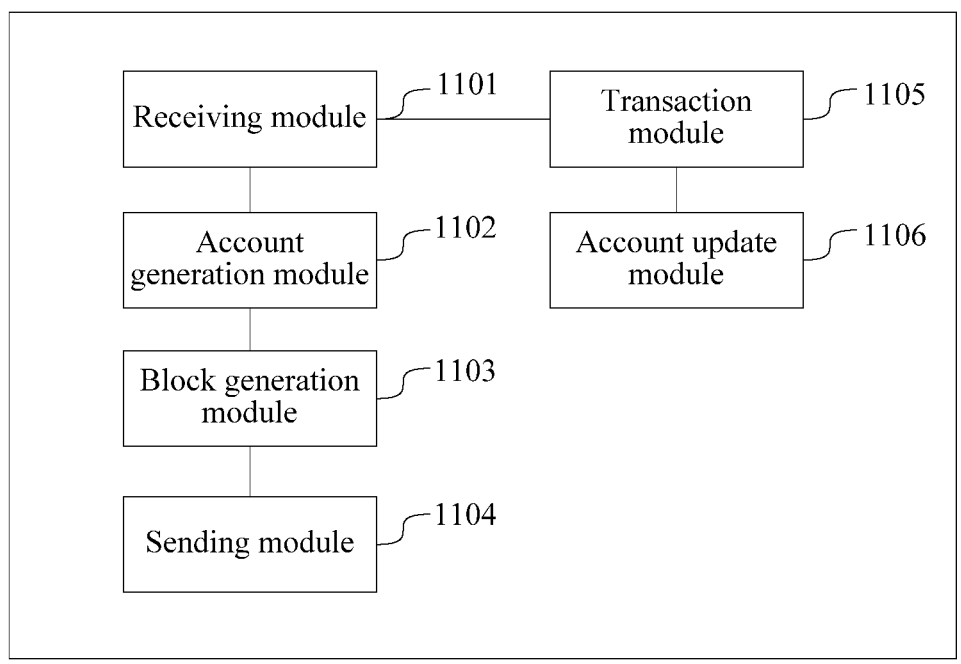
FIG. 12 is a block diagram of an electronic bill management apparatus according to an embodiment.

FIG. 12 is a block diagram of an electronic bill management apparatus according to an embodiment. In a possible implementation, based on the apparatus composition of FIG. 11, referring to FIG. 12, the apparatus further includes: a transaction module 1105 and an account update module 1106.

The transaction module 1105 is configured to perform a bill transaction based on a message exchanged between a first user and a second user when a bill transaction request of the first user is received, the bill transaction request carrying the first bill account.

The account update module 1106 is configured to update bill accounts in the account table when the bill transaction succeeds, and generate, in the block chain, a block used to record a bill transaction of the first user and a block used to record a bill transaction of the second user.

The sending module 1104 is configured to send a transaction success message to the second user.

In a possible implementation, the sending module 1104 is configured to send a first signing request message to the second user, the first signing request message being used to instruct the second user to sign for the first bill account.

The transaction module 1105 is configured to: determine that the bill transaction succeeds, when a first signing confirmation message of the second user is received; and determine that the bill transaction fails, when a first signing rejection message of the second user is received.

In a possible implementation, the account update module 1106 is configured to update the first bill account in the account table and a second bill account of the second user when the bill transaction succeeds.

The block generation module 1103 is configured to generate a third block and a fourth block in the block chain, the third block being used to record this bill transaction event of the first user, and the fourth block being used to record this bill signing event of the second user.

In a possible implementation, the transaction module 1105 is configured to: perform the bill transaction based on the message exchanged between the first user and the second user, when the bill transaction request of the first user is received and if the bill transaction request is a full bill transaction request.

In a possible implementation, the account generation module 1102 is configured to: generate, when the bill transaction request of the first user is received and if the bill transaction request is a partial bill transaction request, based on transaction asset information carried in the partial bill transaction request, a third bill account that is in the account table and that corresponds to the first user; the sending module 1104 is configured to send a second signing request message to the second user, the second signing request message being used to instruct the second user to sign for a partial first bill account; the account update module 1106 is configured to update the first bill account and the third bill account in the account table and a fourth bill account of the second user when a second signing confirmation message of the second user is received; and the block generation module 1103 is configured to generate a sixth block and a seventh block in the block chain, the sixth block being used to record this bill transaction event of the first user, and the seventh block being used to record this bill signing event of the second user.

In a possible implementation, the account update module 1106 is further configured to delete the third bill account from the account table when a second signing rejection message of the second user is received.

In a possible implementation, the bill transaction request is a bill transfer request or a bill discounting request.

In a possible implementation, the sending module 1104 is further configured to send, when the bill transaction request is a bill discounting request, a bill bidding message corresponding to the first bill account to users in the electronic bill management system; and the transaction module 1105 is further configured to use a user having a highest bid on the first bill account as the second user.

Figure 13:
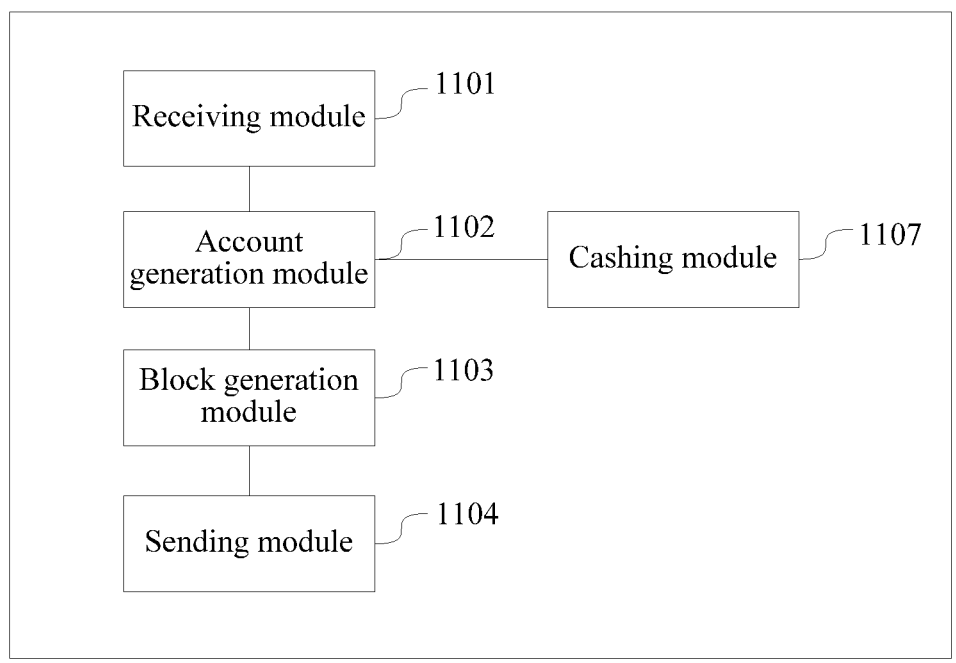
FIG. 13 is a block diagram of an electronic bill management apparatus according to an embodiment.

FIG. 13 is a block diagram of an electronic bill management apparatus according to an embodiment. In a possible implementation, based on the apparatus composition of FIG. 11, referring to FIG. 13, the apparatus further includes: a cashing module 1107, and the cashing module 1107 is configured to send a bill cashing request to the first user when it is detected that the first bill account reaches a cashing deadline; cash an asset corresponding to the first bill account for the first user when a cashing confirmation message of the first user is received; update the first bill account in the account table when a process of the cashing succeeds; generate a fifth block based on the cashing confirmation message and a block header eigenvalue of a previous block; and send a cashing success message to the first user.

In a possible implementation, the account update module 1106 is configured to modify an account state in the account information of the first bill account in the account table according to a transaction process of the bill transaction. The account state includes a transferred state, a discounted state, a cashed state, and/or a normal holding state.

In a possible implementation, the message exchanged in the bill transaction process further carries signature information by signing the message by a message sending user.

Figure 14:
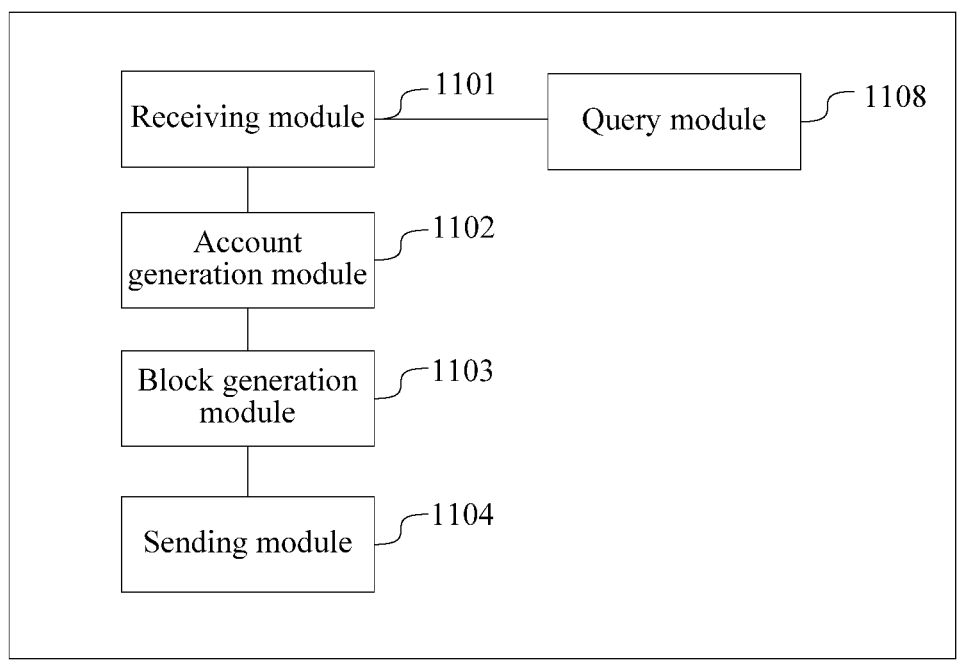
FIG. 14 is a block diagram of an electronic bill management apparatus according to an embodiment.

FIG. 14 is a block diagram of an electronic bill management apparatus according to an embodiment. In a possible implementation, based on the apparatus composition of FIG. 11, referring to FIG. 14, the apparatus further includes:

a query module 1108, configured to, according to a bill identifier in the original bill information, query for commercial bill information corresponding to the bill identifier.

The account generation module 1102 is further configured to perform, if the commercial bill information matches the original bill information, the operation of generating, based on the original bill information, a first bill account corresponding to the first user.

Figure 15:
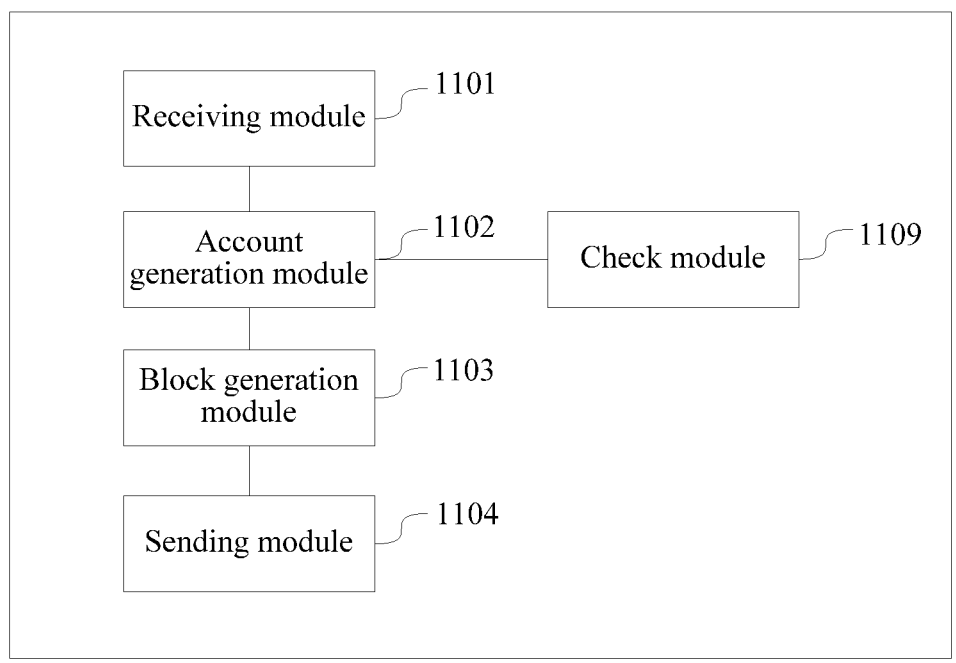
FIG. 15 is a block diagram of an electronic bill management apparatus according to an embodiment.

FIG. 15 is a block diagram of an electronic bill management apparatus according to an embodiment. In a possible implementation, based on the apparatus composition of FIG. 11, referring to FIG. 15, the apparatus further includes:

a check module 1109, configured to: check, when the bill transaction request is received, according to a bill account carried in the bill transaction request, whether the bill transaction request matches the bill account, continue the transaction if the bill transaction request matches the bill account, and end the transaction if the bill transaction request does not match the bill account; and/or the check module 1109 is further configured to: check, when it is detected that the first bill account reaches the cashing deadline, whether the first bill account meets a cashing condition, continue the transaction if the first bill account meets the cashing condition, and end the transaction if the first bill account does not meet the cashing condition.

In a possible implementation, the account update module 1106 is further configured to update, when a signing rejection message of any user for a to-be-signed-for bill account is received, a signing rejection message of the user to the to-be-signed-for bill account in the account table, and/or the account update module 1106 is further configured to update, when a cashing rejection message of any user for a to-be-cashed bill account is received, a cashing rejection message of the user to the to-be-cashed bill account in the account table.

An optional embodiment may be formed by using any combination of all the foregoing optional technical solutions, and details are not described herein.

It should be noted that, when the electronic bill management apparatus provided in the foregoing embodiments manages an electronic bill, it is illustrated with an example of division of the foregoing function modules. In practical application, the foregoing functions may be distributed to different function modules according to requirements, that is, the internal structure of the apparatus is divided into different function modules, so as to finish all or part of the functions described above. In addition, the electronic bill management apparatus provided in the foregoing embodiments and the embodiments of the electronic bill management method belong to one concept. For specific implementation procedures, refer to the method embodiments, and details are not described herein again.

Figure 16:
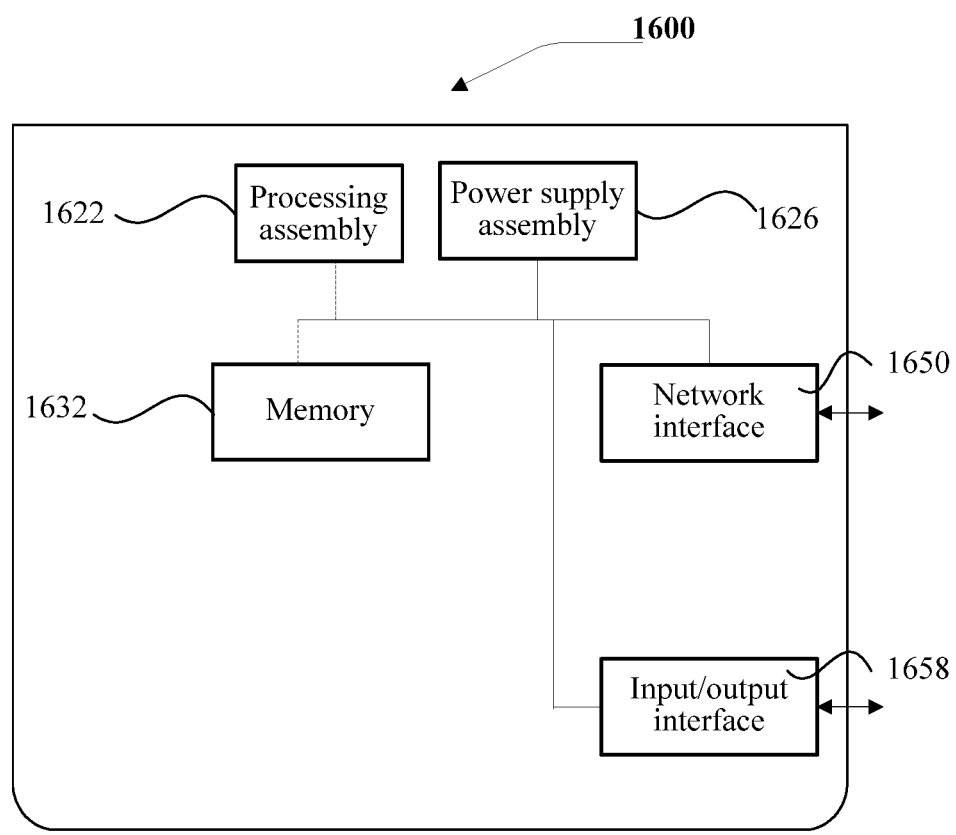
FIG. 16 is a block diagram of an electronic bill management apparatus 1600 according to an embodiment.

FIG. 16 is a block diagram of an electronic bill management apparatus 1600 according to an embodiment. For example, the apparatus 1600 may be provided as a server. Referring to FIG. 16, the apparatus 1600 includes a processing assembly 1622, the processing assembly 1622 further including one or more processors, and a memory resource represented by a memory 1632, the memory resource being used for storing an instruction, for example, an application program, that can be executed by the processing assembly 1622. The application program stored in the memory 1632 may include one or more modules each of which corresponds to a set of instructions. In addition, the processing assembly 1622 is configured to execute the instruction, to perform the method performed by the electronic bill management system in the foregoing embodiments.

The apparatus 1600 may further include a power supply assembly 1626, configured to perform power supply management of the apparatus 1600, a wired or wireless network interface 1650, configured to connect the apparatus 1600 to a network, and an input/output (I/O) interface 1658. The apparatus 1600 may operate an operating system stored in the memory 1632, for example, Windows Server™, Mac OS X™, Unix™, Linux™, or Free BSD™.

In an exemplary embodiment, a non-transitory computer readable storage medium including an instruction is further provided, for example, a memory including an instruction, and the foregoing instruction may be executed by a processor in a server to complete the electronic bill management method in the foregoing embodiments. For example, the non-transitory computer readable storage medium may be a ROM, a random access memory (RAM), a CD-ROM, a magnetic tape, a floppy disk, an optical data storage device, or the like.

An embodiment further provides a storage medium, the storage medium storing at least one instruction, at least one program, and a code set or an instruction set, and the at least one instruction, the at least one program, and the code set or the instruction set being loaded and executed by the processor to implement the electronic bill management method in the foregoing embodiments.

The sequence numbers of the foregoing embodiments are merely for description purpose but do not indicate the preference of the embodiments.

A person of ordinary skill in the art may understand that all or some of the operations of the foregoing embodiments may be implemented by using hardware, or may be implemented by a program instructing relevant hardware. The program may be stored in a computer readable storage medium. The above-mentioned storage medium may be a read-only memory, a magnetic disk, an optical disc, or the like.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. An electronic bill management method performed in an electronic bill management system, the method comprising:
receiving a bill issuance request of a first user, the bill issuance request comprising original bill information;
generating, based on the original bill information, a first bill account corresponding to the first user, and storing account information of the first bill account to an account table in the electronic bill management system;
generating a second block based on the bill issuance request, the first bill account, and a block header eigenvalue of a first block in a block chain in the electronic bill management system, the first block being a previous block of the second block in the block chain, event information of a bill issuance event of the first user being recorded based on the second block; and
transmitting an issuance success message to the first user, the issuance success message comprising the first bill account,
wherein the bill issuance request includes signature information of the first user, which is obtained by signing the bill issuance request by the first user by using a private key issued by the electronic bill management system, and
wherein eigenvalue calculation is performed on the event information, the original bill information, account information of the first bill account, and the signature information, to obtain a block body eigenvalue of the second block, which is stored to a block header of the second block.

2. The method according to claim 1, wherein after the transmitting comprises:
performing a bill transaction based on a message exchanged between the first user and a second user in response to receiving a bill transaction request of the first user, the bill transaction request comprising the first bill account;
updating bill accounts in the account table in response to the bill transaction being successful, and generating, in the block chain, a block based on which a bill transaction of the first user is recorded and a block based on which a bill transaction of the second user is recorded; and
transmitting a transaction success message to the second user.

3. The method according to claim 2, wherein the performing comprises:
transmitting, to the second user, a first signing request message to the second user, the first signing request message requesting to sign for the first bill account;
determining that the bill transaction is successful, in response to receiving a first signing confirmation message of the second user; and
determining that the bill transaction fails, in response to receiving a first signing rejection message of the second user.

4. The method according to claim 2, wherein the updating comprises:
updating the first bill account in the account table and a second bill account of the second user in response to the bill transaction being successful; and
the generating, in the block chain, the block based on which the bill transaction of the first user is recorded and the block based on which the bill transaction of the second user is recorded comprises:
generating, in the block chain, a third block based on which a bill transaction event of the first user is recorded and a fourth block based on which a bill signing event of the second user is recorded.

5. The method according to claim 2, wherein the performing comprises:
performing the bill transaction based on the message exchanged between the first user and the second user in response to receiving the bill transaction request of the first user and further in response to the bill transaction request corresponding to a full bill transaction request.

6. The method according to claim 2, wherein the performing comprises:

in response to receiving the bill transaction request of the first user and further in response to the bill transaction request corresponding to a partial bill transaction request, generating, based on transaction asset information included in the partial bill transaction request, a third bill account that is in the account table and that corresponds to the first user; and transmitting, to the second user, a second signing request message requesting to sign for a partial first bill account, and wherein the updating comprises:

updating the first bill account and the third bill account in the account table and a fourth bill account of the second user in response to receiving a second signing confirmation message of the second user; and generating, in the block chain, a sixth block based on which a bill transaction event of the first user is recorded, and a seventh block based on which a bill signing event of the second user is recorded.

7. The method according to claim 6, further comprising:
deleting the third bill account from the account table in response to receiving a second signing rejection message of the second user.

8. The method according to claim 2, wherein the bill transaction request corresponds to a bill transfer request and/or a bill discounting request.

9. The method according to claim 8, further comprising:
in response to the bill transaction request corresponding to the bill discounting request, transmitting a bill bidding message corresponding to the first bill account to users in the electronic bill management system; and
using a user having a highest bid on the first bill account as the second user.

10. The method according to claim 1, further comprising:
transmitting a bill cashing request to the first user in response to detecting that the first bill account reaches a cashing deadline;
cashing an asset corresponding to the first bill account for the first user in response to receiving a cashing confirmation message of the first user;
updating the first bill account in the account table in response to the cashing being successful, and generating a fifth block based on the cashing confirmation message and a block header eigenvalue of a previous block of the fifth block; and
transmitting a cashing success message to the first user.

11. The method according to claim 2, further comprising:
modifying an account state in the account information of the first bill account in the account table according to the bill transaction, wherein
the account state comprises a transferred state, a discounted state, a cashed state, and/or a normal holding state.

12. The method according to claim 2, wherein the message exchanged comprises signature information obtained by signing the message by a message transmitting user between the first user and the second user.

13. The method according to claim 1, further comprising:
based on a bill identifier in the original bill information, querying for commercial bill information corresponding to the bill identifier; and
in response to the commercial bill information matching the original bill information, generating, based on the original bill information, the first bill account corresponding to the first user.

14. The method according to claim 2, further comprising performing at least one of:

in response to receiving the bill transaction request, determining, according to a bill account included in the bill transaction request, whether the bill transaction request matches the bill account, continuing the bill transaction in response to determining that the bill transaction request matches the bill account, and ending the bill transaction in response to determining that the bill transaction request does not match the bill account; and in response to detecting that the first bill account reaches a cashing deadline, determining whether the first bill account meets a cashing condition, continuing the bill transaction in response to determining that if the first bill account meets the cashing condition, and ending the bill transaction in response to determining that the first bill account does not meet the cashing condition.

15. The method according to claim 2, further comprising performing at least one of:

in response to receiving a signing rejection message of any user for a to-be-signed-for bill account, updating the signing rejection message of a corresponding user to the to-be-signed-for bill account in the account table, and in response to receiving a cashing rejection message of any user for a to-be-cashed bill account, updating the cashing rejection message of a corresponding user to the to-be-cashed bill account in the account table.

16. An electronic bill management apparatus, the apparatus comprising:

at least one memory operable to store program code; and
at least one processor operable to read the program code and operate as instructed by the program code, the program code comprising:

receiving code configured to cause the at least one processor to receive a bill issuance request of a first user, the bill issuance request comprising original bill information;

account generation code configured to cause the at least one processor to generate, based on the original bill information, a first bill account corresponding to the first user, and store account information of the first bill account to an account table in an electronic bill management system;

block generation code configured to cause the at least one processor to generate a second block based on the bill issuance request, the first bill account, and a block header eigenvalue of a first block in a block chain in the electronic bill management system, the first block being a previous block of the second block in the block chain, event information of a bill issuance event of the first user being recorded based on the second block; and transmitting code configured to cause the at least one processor to transmit an issuance success message to the first user, the issuance success message comprising the first bill account, wherein the bill issuance request includes signature information of the first user, which is obtained by signing the bill issuance request by the first user by using a private key issued by the electronic bill management system, and wherein eigenvalue calculation is performed on the event information, the original bill information, account information of the first bill account, and the signature information, to obtain a block body eigenvalue of the second block, which is stored to a block header of the second block.

17. The apparatus according to claim 16, wherein the program code further comprises:
- transaction code configured to cause the at least one processor to perform a bill transaction based on a message exchanged between the first user and a second user in response to a bill transaction request of the first user is received, the bill transaction request comprising the first bill account; and
- account update code configured to cause the at least one processor to update bill accounts in the account table in response to the bill transaction being successful, and generate, in the block chain, a block based on which a bill transaction of the first user is recorded and a block based on which a bill transaction of the second user is recorded,
- wherein the transmitting code causes the at least one processor to transmit a transaction success message to the second user.

18. The apparatus according to claim 17, wherein
the transmitting code causes the at least one processor to transmit, to the second user, a first signing request message requesting to sign for the first bill account, and
the transaction code causes the at least one processor to: determine that the bill transaction is successful, in response to receiving a first signing confirmation message of the second user, and determine that the bill transaction fails in response to receiving a first signing rejection message of the second user.

19. The apparatus according to claim 17, wherein
the account update code causes the at least one processor to update the first bill account in the account table and a second bill account of the second user in response to the bill transaction being successful; and
the block generation code causes the at least one processor to generate a third block and a fourth block in the block chain, the third block being used to record this bill transaction event of the first user, and the fourth block being used to record this bill signing event of the second user.

20. A non-transitory computer storage medium storing instructions, which, when executed by at least one processor, cause the at least one processor to perform:
- receiving a bill issuance request of a first user, the bill issuance request comprising original bill information;
- generating, based on the original bill information, a first bill account corresponding to the first user, and storing account information of the first bill account to an account table in an electronic bill management system;
- generating a second block based on the bill issuance request, the first bill account, and a block header eigenvalue of a first block in a block chain in the electronic bill management system, the first block being a previous block of the second block in the block chain, event information of a bill issuance event of the first user being recorded based on the second block; and
- transmitting an issuance success message to the first user, the issuance success message comprising the first bill account,
- wherein the bill issuance request includes signature information of the first user, which is obtained by signing the bill issuance request by the first user by using a private key issued by the electronic bill management system, and
- wherein eigenvalue calculation is performed on the event information, the original bill information, account information of the first bill account, and the signature information, to obtain a block body eigenvalue of the second block, which is stored to a block header of the second block.

\* \* \* \* \*